United States Patent [19]

Roesel, Jr.

[11] 4,168,459

[45] Sep. 18, 1979

[54] NON-INTERRUPTIBLE POWER SUPPLY SYSTEMS

[75] Inventor: John F. Roesel, Jr., Bradenton, Fla.

[73] Assignee: Precise Power Corporation, Bradenton, Fla.

[21] Appl. No.: 844,597

[22] Filed: Oct. 25, 1977

[51] Int. Cl.² .................. H02K 16/00; H02K 21/04; H02K 47/04

[52] U.S. Cl. .................................. 322/29; 310/112; 322/46; 322/47; 363/174

[58] Field of Search .............................. 322/29–32, 322/46, 47, 90; 363/160, 161, 174, 175; 310/113, 112

[56] References Cited

U.S. PATENT DOCUMENTS

| | | | |
|---|---|---|---|
| 3,246,231 | 4/1966 | Clarke | 363/160 |
| 3,287,622 | 11/1966 | Eckenfelder et al. | 363/161 |
| 3,521,149 | 7/1970 | Roesel, Jr. | 322/47 |
| 3,931,535 | 1/1976 | Roesel, Jr. | 322/47 X |

Primary Examiner—Robert J. Hickey
Attorney, Agent, or Firm—Frederick Shapoe

[57] ABSTRACT

A non-interruptible power system (NIPS) for generating polyphase A.C. of a substantially constant desired frequency and a substantially constant selected voltage, comprising:

(A) a source of interruptible power and a motor energized thereby, (B) a novel generator for producing the desired polyphase A.C. driven by the motor, the generator comprising a plurality of field cores each having a cylindrical surface with a layer of magnetizable permanent magnetic material thereon, cooperatively juxtaposed wound stators each with an excitation coil therein for magnetizing an adjacent layer of permanent magnetic material into a pattern of magnetic poles and at a high remanent flux density, modifying windings for changing the remanent flux density in such pole pattern, supplementing windings for energizing the excitation coil, and primary potential generating windings in slots in the stator, a source of exciter current, and electrical control means for the generator, (C) the generator producing the desired substantially constant frequency A.C. at the desired voltage regardless of variations in the motor speed and even for a brief period of time when the source of power to the motor is interrupted by converting a part of its rotational energy to A.C. output, and leading windings, alone, or with lagging windings, in each of the wound stators having the primary windings, the leading and lagging windings being placed in such positions that, in a three-stator generator, they will each generate a single phase A.C. potential from about 110° to 115° out of phase with the single phase A.C. generated by the primary windings in the same stator, but the A.C. potentials of the leading windings and lagging windings of one stator will each be synchronous with the single phase A.C. potential developed in the other stators' primary windings, thereby obtaining three phase A.C. having a low total harmonic distortion.

17 Claims, 8 Drawing Figures

NON-INTERRUPTIBLE POWER SUPPLY SYSTEMS

PRIOR ART

The present invention is an improvement over the inventions disclosed in my prior U.S. Pat. Nos. 3,521,149 issued July 21, 1970 and 3,931,535 issued Jan. 6, 1976. Neither of these earlier patents show the modifying and supplementing windings of the present invention. The invention here also discloses the use of leading and lagging windings and their connection with the primary windings in another stator. Other novel features are also disclosed which are not in the patents.

The following series of publications refer to the generator of U.S. Pat. No. 3,521,149 and applications therefor:

"New Alternator Delivers 60-Cycle Power at any Speed" by E. F. Lindsley, pgs. 38 to 40 of the July 1973 issue of *Popular Science*, Vol. 203, No. 1;

"The Roesel Generator" by L. R. Herman, IEEE P.E.S. Winter Meeting and Tesla Symposium, Paper No. A76 035 6, published Jan. 25-30, 1976;

"The Roesel Generator—A Unique Variable Speed-Constant Frequency Generator" by R. R. Ott, R. J. Barber and J. F. Roesel, presented June, 1975 at the IEE Applied Magnetic Workshop at Marquette University;

"Independent Energy Systems for Better Efficiency" by O. W. Marshall, R. T. Morash and R. J. Barber, presented August, 1974 at the 9th Intersociety Energy Conversion Engineering Conference, American Society of Mechanical Engineering, pgs. 531 to 537;

"Precise Power for Industrial Controls" by R. T. Morash, R. R. Ott, R. J. Barber and O. W. Marshall, presented April, 1975 at the Milwaukee Symposium for Industrial Control; and "Line Isolation for Industrial Control Systems" by R. J. Barber, O. W. Marshall, R. R. Ott and R. T. Morash presented March, 1974 at Proceedings of Milwaukee Symposium on Automatic Controls.

British Pat. No. 576,351 dated Mar. 29, 1946 is directed to a generator having a constant frequency but variable voltage output. In the patent structure a variable speed rotor comprising a solid sleeve or cylinder of steel or other high coercivity material is placed within a stator having an input winding supplied with A.C. which magnetizes the steel sleeve of the rotor and this induces an A.C. in an output winding on the stator of similar frequency as in the input winding, but the voltage output is directly related to and varies as the speed of the rotor varies. The construction and operation of the British Patent apparatus gives the opposite result of the apparatus of the present invention wherein both the voltage as well as the frequency remain constant regardless of variations in the speed of the rotor. Furthermore, the construction of this patent employs a solid sleeve or cylinder of steel or other high coercivity material and an A.C. input winding in the stator, and this is inherently unsuitable for generating a useful power output. Tests have shown that usually more wattage is required by the input winding in magnetizing the rotor than the wattage that can be obtained in the output windings.

BACKGROUND OF THE INVENTION

For numerous applications in industry, laboratories, military and commerce, it is highly desirable that there be a supply of A.C. power of a relatively constant frequency, of a relatively constant selected voltage and that this power be furnished without interruptions. A marked drop in frequency, a large drop in voltage or a complete interruption can cause either malfunctioning or misfunctioning of the apparatus to which the A.C. power is being furnished. In some cases serious damage may result. Computers and electronic control systems can malfunction seriously if the voltage or frequency depart from narrowly restricted limits.

Public utility systems are regarded as being quite reliable, but as is brought out in an article on pages 100 to 102 in the May 10, 1975 issue of "Electronic Design", in the average utility system, major line faults with voltage drops of 75% or more, including complete outages, lasting for relatively long periods of time, can be expected about 10 times a year; while minor faults during which the voltage may drop as much as 25% occur on an average of from 500 to 1000 times a year. In such systems, transients and spikes in the voltage in the utility lines may average more than 10,000 times per year, with line surges being up to as much as 2,000% of normal line voltage and lasting for periods of up to several milliseconds and sometimes exceeding 10 milliseconds. It is common knowledge that extremes of cold or hot weather place such demands on the public utility lines that the utility may be forced to reduce line voltages up to as much as 10% (so-called "brown-outs") or to eliminate delivery of power to certain sections or to isolate industrial plants from power. Unexpected or unpredictable events such as accidents, storms, fires, and the like cause circuit breakers to function to isolate the areas where lines may be shorted or damaged by such occurrences.

As a broad categorization, the probability of power disturbances in, for example, 60 and 50 Hz utility power lines, are as follows:

(a) occasional total power failures lasting from about a minute to a day or more;

(b) much more frequent brief complete power failures or interruptions lasting from a few cycles up to some seconds, but ordinarily less than a minute; and (c) numerous voltage and frequency irregularities such as surges, spikes, dips, transients and "noise".

Each of these three classes of power line disturbances can cause serious problems in the functioning of computers, electrical control equipment such as numerically controlled machine tools, communications including radio, TV broadcasting and telephony, process controls in shops and laboratories, and detection and monitoring systems. Even a brief interruption or a voltage spike or drop beyond a rather narrow margin can result in a malfunction of a computer, for instance, which is often not observed or noted, and great difficulty is encountered in subsequently determining that a malfunction did occur and where or when the erroneous operation took place. When process controls fail to function due to power failure they may result in a dangerous or costly malfunction of the controlled apparatus with damage not only to the apparatus being controlled, but also to the material or product being treated or processed.

It is known to provide stand-by or auxiliary power sources in hospitals, radio and television stations, and police stations, for instance, to furnish emergency power in the event that power is interrupted in a utility line which normally supplies the power needed in these facilities. Two of the most widely used stand-by systems are (1) storage batteries with electrical controls such as D.C. to A.C. inverters and suitable switching means, and (2) engine operated generators with controls and switches. The shortcomings of the battery systems are their short periods of usefulness which are of the order of 15 minutes for full power replacement, long recharging times after each use of up to from 8 to 20 hours, high first cost, and substantial space and maintenance requirements. Engine-generator units take a material time period to get them started and to deliver power, so that normally there is a substantial time interval from the instant when the utility power is interrupted until the controls are activated and the engine is started, and auxiliary power is supplied to the equipment. The A.C. power from such stand-by generators is usually not comparable to the normal utility A.C. power in evenness of voltage levels and regularity of frequency. In all cases, it is extremely costly to provide any auxiliary system that will take over immediately upon the failure of the utility power so as to furnish A.C. of high uniformity, of precisely selected frequency and a substantially constant selected voltage. A recent survey of systems for protecting electrical apparatus from the effects of various power line failures is set forth in an article entitled "Power Protection Equipment: A Survey" appearing on pages 38 to 45 of the July 1977 issue of "Mini-Micro Systems". The capabilities and the shortcomings of many such commercially usable systems is set forth therein. It should be noted that an error appears on page 41, in that in the horizontal two rows under "Noise Rejection", the "Roesel Generator" (U.S. Pat. No. 3,521,149) should be indicated as "superior rejection", rather than being listed under "none".

It is highly desirable to have available a non-interruptible power system (NIPS) to provide polyphase A.C. of a substantially constant selected frequency and a substantially constant selected voltage for many commercial, industrial, governmental and defense, scientific and medical applications at a low original cost, that is efficient, easy and inexpensive to maintain, and is highly reliable. It should be compatible or readily phased in with a public utility power system.

SUMMARY OF THE INVENTION

The main object of the invention is to provide a polyphase A.C. NIPS that is of low cost, efficient, reliable, and easily and cheaply maintained. The NIPS of this invention is normally supplied power from a public utility power line, or equivalent source, which is subject to irregularities or interruptions, to energize a rugged and reliable motor which drives a polyphase generator of novel design that produces and supplies to a load an uninterrupted output of polyphase A.C. of substantially constant frequency and substantially constant voltage, both voltage and frequency being selected to meet the user's requirements, regardless of any irregularities or interruptions in the utility power. The NIPS completely isolates and insulates the load which it supplies from all variations, irregularities, and failures in the utility power line.

In the event of total interruption of the utility power, the rotational inertia of the motor and generator is employed to enable the novel generator to supply the desired A.C. for a brief but substantial period of time to the load. If the utility power is interrupted for more than some 5 to 20 seconds, for instance, a stand-by engine may be automatically activated to generate power to turn the motor of the NIPS unit. When power is restored on the utility line, possibly days later, the NIPS unit is automatically reconnected thereto while the stand-by engine is disconnected and shut down. In any and all circumstances, the NIPS unit is able to supply the desired A.C. without any pause to its load. The novel generator of this invention produces steadily and uninterruptedly an electrical output of, for example, 50 Hz, 60 Hz or 400 Hz, to its load even when the driving motor speed may vary or even when the load rises or falls abruptly, from any utility circuit.

For a three phase output, the novel NIPS generator comprises a support mounting three main field cores and an exciter field core, each field core being of a high permeability soft magnetic material such as laminations of 3% silicon steel. Each of the four field cores has a cylindrical surface upon which is applied a thin layer of a hard or permanent magnetic material. The exciter field core has its layer of permanent magnet material permanently magnetized into a pattern of north and south magnetic poles. On the main field cores the layer of permanent magnet material is magnetizable in operation of the generator to a desired pattern of north and south magnetic poles and to a remanent magnetic flux, which pattern will usually be varied continually, by an excitation coil.

On another support are mounted three main power generating slotted wound armatures and a slotted wound exciter armature, each comprising a core of laminated soft magnetic material of high permeability, and each having a cylindrical surface matching the cylindrical surface of the field cores so that they can rotate with respect to the other with a small clearance space therebetween when juxtaposed in aligned operative position. The driving motor rotates one support with respect to the other so that the wound armatures can generate electrical potentials as the magnetically patterned permanent magnet layers of the field cores pass by. The term "armature" as used herein, is applied to the slotted wound cores even if they are stationary as they are in certain preferred embodiments of the invention.

The three slotted wound main power generating armature cores, other than the wound exciter armature core, each have a pair of slots with an excitation coil therein. When suitably energized with an alternating current derived from the exciter stator, the excitation coil in each power generating armature coil will magnetize the layer of permanent magnet material in the main field core juxtaposed to it, to a predetermined pattern of north and south magnetic poles with a given level of an initial remanent magnetic flux density. Also in each of these three wound main cores is a modifying winding placed in slots spaced from the excitation coil slots, preferably at a point diametrically opposite to the excitation coil. The modifying winding is suitably energized with electrical current to produce a magnetic flux that will be effective to change the initial remanent flux density in the layer of permanent magnetic material juxtaposed to it to a density level that will generate a desired voltage in the primary windings in the armature cores. Primary windings are disposed in slots on each side of the diametral line passing through the excitation coil to provide for a two pole stator winding configuration. In slots at about 60° and 240° clockwise from the excitation coil are wound supplementing windings which generate an A.C. which is conveyed to the excitation coil to supplement the alternating current which is supplied from the exciter windings in the exciter core.

The exciter armature slots are wound in conventional fashion to generate a high frequency A.C. potential as it moves with respect to the permanently magnetized layer in the exciter field core.

The primary windings in each main armature core will generate single phase A.C. which has a moderate level of total harmonic distortion. The potential outputs of the three main armature cores can be combined to provide three phase A.C., which is well suited for use in many applications to advantage because it is of substantially constant frequency and voltage.

In order to meet the more exacting requirements of some applications, the total harmonic distortion present in the A.C. potential output of the primary windings can be materially improved by providing in each of the main armature cores, sets of leading windings. These are so wound into selected slots that each will produce single phase A.C. characterized by (1) being leading from about 110° to 115° with respect to the single phase A.C. potential generated by the primary winding of the same armature, but is in synchronism with the A.C. output of the primary windings of another armature core and (2) being of a modified wave shape such that when it is connected in series with the primary windings of the other armature with which it is in synchronism, a combined sinusoidal wave with low harmonic distortion is produced. A total harmonic distortion of less than 5% can be obtained. The primary windings will usually be with sufficient turns to generate from about 60 to 70% of the voltage and the leading windings will provide the balance—40% to 30%.

For an optimum improvement in total harmonic distortion for the most demanding applications, each of the three main armature cores is also wound with sets of lagging windings. The lagging windings are so wound into selected slots as to be a mirror image, with respect to the leading windings on a vertical plane through the excitation coil, and each will generate single phase A.C. potential characterized by (1) being lagging from about 110° to 115° with respect to the single phase A.C. potential generated in the primary windings of the same armature, but is in synchronism with the A.C. potential output of another primary winding and (2) being of a modified wave shape such that when the lagging windings are connected in series with the primary windings with which it is in synchronism, a great improvement in total harmonic distortion of the combined A.C. potential is obtained. By connecting a primary winding of one armature with the leading winding of another armature and the lagging winding of a third armature, with both of which it is in synchronism, the integrated single phase A.C. potential will have a very low total harmonic distortion, which may be much less than 5%. It is desirable to proportion the voltage contributions of the three sets of windings in the amount of about 50% from the primary windings, about 25% from the leading windings and about 25% from the lagging windings. The number of turns of each winding in the slots determines the voltage generated by the winding.

The placement of the leading windings is as follows: (a) one set of turns is disposed in several slots adjacent to and on both the right and left sides of the excitation coil; and (b) a second set of turns is disposed and looped between several successive slots immediately following, in a counter-clockwise direction, the left hand slots containing the (a) set of turns, and the loops of these turns are then placed in several successive slots beginning with the first slot to the right of the diametral line extending through the modifying winding and extending counter-clockwise therefrom. The lagging windings are placed as follows: (c) one set of turns disposed in the same slots as the (a) set of leading windings; and (d) a second set of turns wound in several successive slots extending in a clockwise direction immediately following the right hand slots containing the (a) and (c) set of turns, and the turns then being wound in several successive slots beginning with the first slot to the left of the diametral line through the modifying coil and extending clockwise therefrom. One skilled in the art will understand that the number of turns in each slot can vary and that the number of slots containing the leading and lagging windings can be selected in accordance with the amount of and kind of wave shape configuration desired to secure a particular low level of total harmonic distortion. By employing the teaching set forth herein, A.C. potential outputs of a complementing shape can be secured from the leading and/or lagging windings which are applied in series to the primary windings with which the A.C. potentials are synchronous, and when so combined provide an integrated A.C. potential of low total harmonic distortion.

Novel electrical control means are provided to carry out several functions, one function being to modify and control the flow of A.C. from the exciter windings to supply alternating current to the excitation coils in each of the three armatures at such times, in such amounts, and at such an A.C. frequency, that the layer of permanent magnetic material in each juxtaposed field core will assume a predetermined pattern of north and south magnetic poles at a high initial remanent flux density. The supplementing winding is connected in a resonant circuit to furnish additional electrical current to the excitation coil in timed intervals, to supplement the electrical current derived from the exciter coil. In response to any excess voltage output of the primary windings induced when they react with the remanent flux of the north and south pole pattern in the layer of permanent magnet material in the juxtaposed field core, the control means includes a voltage regulator that causes a timed flow of electrical current to the modifying windings in each armature to the extent necessary to reduce or modify the remanent flux density of each north or south magnetic pole in the layer of permanent magnet material to a level such that the primary windings will generate the desired voltage. This control can be applied to single phase A.C. generators having a single armature, or to two phase units with two armatures, as well as being applied to polyphase units.

The voltage output of the primary power generating windings (including the leading and lagging windings) in each of the main armature cores, may be further controlled by regulating the amperage of the A.C. supplied to the excitation coil thereof, so that it will magnetize the layer of permanent magnetic material to an initial remanent flux density just sufficient to induce in the primary windings the desired voltage. This can be readily accomplished by shunting a controllable, variable reactance across the output leads from the exciter, with the variable reactance being controlled by an output from the voltage regulator in the electrical control means. Alternatively, a variable reactance may be placed in series in the output leads. The voltage regulator would also concurrently supply correcting inputs to the modifying coil so that it will be operative, first, to provide for a fine voltage control by making any required small modifications in the initial remanent magnetic flux density of the layer of permanent magnetic material and, second, providing for a rapid change in such initial remanent flux density in the event that the voltage of the winding suddenly changes due to abrupt load changes or other conditions tending to cause a sudden voltage variation.

Other electrical control means components are provided to become operative when the public utility power is interrupted for more than a few seconds or other predetermined time period, for example, there is employed a switch means with a time lag mechanism, which will cause a stand-by engine to be started and drive the rotor of the motor directly. This can be accomplished through a magnetic clutch. The stand-by engine can drive a stand-by generator to generate electrical power which is then conveyed to operate the NIPS motor. The utility power line is also disconnected until power flow therein is resumed, at which time the electrical control means stops the engine and reconnects the motor to the utility line.

DETAILED DESCRIPTION OF THE INVENTION

Figure 1:
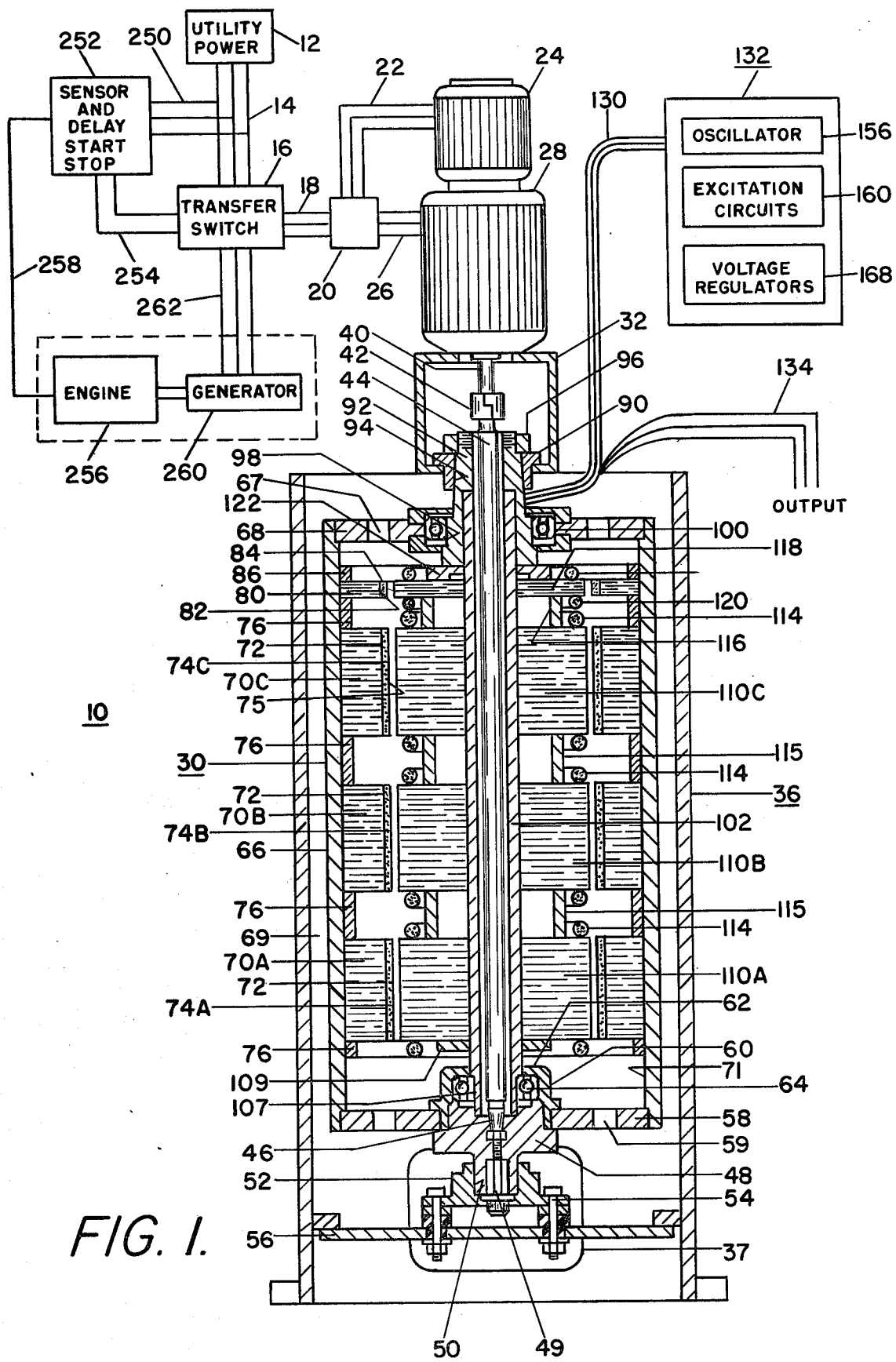
FIG. 1 is a schematic overall view, partly in cross-section, of the NIPS system.

In FIG. 1 of the drawing, there is a showing, partly in cross-section and partly schematically, of a NIPS unit 10 for supplying an electrical output of substantially constant selected frequency three phase A.C. current, at a substantially constant selected voltage. The NIPS unit 10 is normally energized by electrical current from a utility power source 12, or an equivalent source of electrical power, which is subject to interruptions. For NIPS units of, say two kilowatts and higher output, the utility power source 12 will usually supply three phase, 60 or 50 Hz A.C., introduced by the usual three wire line 14. For smaller NIPS units, of a kilowatt or less output, a single phase A.C. line may be adequate.

The line 14 leads to a transfer switch 16 from which, as long as usable electrical power flows from source 12, electrical current is conveyed by wiring 18 to a motor contractor unit 20. In starting the system from standstill condition, the contactor unit 20 initially supplies electrical current through wiring 22 to a rugged starting motor 24 which is desirably an induction motor with a high resistance rotor so that as full line voltage is applied to the field there is developed a high resistance which limits the field current in the stator to an acceptable low value. The frame of starting motor 24 is joined to the frame of a running motor 28 with their shafts united together and running as a unit. When the starting motor 24 reaches a speed close to the desired operating speed of the system, as for example about ⅔ thereof, the motor contactor unit 20 operates to switch the line current passing through lead 22 to pass through leads 26 to running motor 28 which is a high efficiency and reliable induction motor such, for example, as a squirrel cage motor, which when so energized by current from line 18 will soon attain a normal operating speed of about 3550 rmp, if 60 Hz output is desired, at full rated load. Power to the starting motor 24 is interrupted by the contactor unit 20 either as soon as running motor 28 is energized or soon thereafter. Thereupon motor 28 operates alone in normal functioning of the system 10, wherein the motor operates a generator, generally indicated as 30.

Generator Unit

The joined frames of motors 24 and 28 are firmly attached to the upper face of a box girder shaped support housing 32, which is suitably mounted on the top end of a generally cylindrical main housing frame 36. The lower end 40 of the conjoined motor shafts projects into the space within the support housing 32 where it is connected by a coupling 42 to the upper end of a generator shaft 44 of the generator unit 30. The generator shaft 44 projects downwardly toward the lower end of the main housing frame 36, where it ends in a tapered terminal 46 which is provided with a keyway or spline so that it will rigidly fit within a mating socket in a lower hub 48 to be driven thereby, with bolt means 49 fastening them together. The lower hub 48 has a downwardly projecting central end bearing 50 turning freely in a flange bearing 52 attached by bolts 54 passing through rubber shock mountings to a stringer plate 56 whose ends are affixed, as by bolts or welds, to the inside walls of the main housing frame 36. This construction maintains the lower end of the shaft 44 in a precise centered position and reduces vibration and also restricts lateral movement thereof.

To the lower hub 48 is firmly affixed both a lower circular plate 58 and a central cylindrical retainer 60 with an inturned upper flange 62, so that they rotate as a unit. The inturned flange 62 embraces the outer race of a ball bearing 64 about which it can rotate freely. Air passages 59 are provided in the lower plate 58, to which cooling air is admitted by openings 37 at the bottom of the housing frame 36. Attached to the outer periphery of the lower circular plate 58 is a large cylindrical rotor sleeve 66 which extends upwardly and coaxially about the shaft 44 and has bolted or releasably fastened to its top end an upper rotor end plate 68 provided with air vents 67. Thus, cooling air entering by openings 37 passes through air passages 59 to the interior of rotor sleeve 66, and heated air escapes through air vents 67, and finally exhausts through the open, upper end of housing frame 36. A clearance space 69 is present between the housing frame 36 and rotor sleeve 66 to enable free rotation of the latter as it is revolved by shaft 44, as well as letting cooling air to circulate therethrough.

The current generating components of the generator 30 are located within the cylindrical rotor sleeve 66 and comprise three rotating field cores 70A, 70B and 70C affixed to the inside walls 71 of the rotor sleeve 66. Each field core is comprised of a soft magnetic material of high permeability such as silicon steel laminations, cobalt-iron laminations or compacted particles of soft magnetic material such as soft iron or silicon-iron. Each of the field cores 70A, 70B and 70C has a large central cylindrical aperture 72 coaxial with shaft 44. On the face of each aperture is applied a thin layer 74A, 74B and 74C, respectively, of a permanent or hard magnetic material, preferably a high resistance ceramic material such as, for example, barium ferrite, strontium ferrite or mixed ferrite, or the like material with a high magnetic memory, applied either as thin plates cemented to the face of the aperture or applied as a mixture of powdered ceramic magnetic or Alnico material and a resinous binder and cured in situ. The exposed face 75 of each of the permanent magnet layers 74A, 74B and 74C is cylindrical and coaxial with shaft 44. Spacer rings 76 affixed to the inside walls of the rotor sleeve 66 are disposed below, between and above the field cores 70A, 70B and 70C in order to position and maintain the field cores in place.

Above the topmost spacer ring 76 placed at the upper end of core 70C is disposed a smaller exciter field core 80 comprised of high permeability, soft magnetic material similar to that in the other cores 70A, 70B and 70C. Field core 80 has a central cylindrical aperture 82 coaxial with the shaft 44 and on the face of this cylindrical aperture 82 is placed a layer 84 of permanently magnetized, permanent magnet material, which may be of the type used for layer 74, and cemented thereon by an epoxy, polyester or other resin. These permanent magnets are arranged with a selected number and configuration of alternate North and South poles. The exposed surface of the layer 84 is cylindrical and coaxial with shaft 44. A retainer ring 86 affixed to the inside walls of sleeve 66 is placed above and in contact with the top end of field core 80 so as to keep it firmly in place.

Generator Stator

Extending through the bottom wall of the box girder shaped support housing 32 is a large collar bushing 90, welded or bolted thereto, having a conical bore therein into which is fitted an upper stepped support 92 which has a mating conical portion 94, and support 92 is firmly and nonrotatably fastened therein by a lock nut 96. Below the conical portion 94 of support 92 is a shoulder or step 98 on which firmly rests a ball bearing 100 to whose outer race is attached the upper rotor plate 68, so that the latter can freely rotate about the fixed support 92. The upper end of a long tubular sleeve 102 is securely fastened into an internal bore in the fixed support 92, and projects downwardly and concentrically about shaft 44 with a clearance space being present between them. The lower end of the tubular sleeve 102 terminates at the lower hub 48 in a shoulder or step 107, into which the inner race of ball bearing 64 fits and is retained firmly thereon by suitable fastening means such as a lock nut.

Just above the ball bearing 64, the tubular sleeve 102 has a ring plate 109 slidably mounted thereon, and resting on this ring plate are a series of successive slotted stator cores 110A, 110B, and 110C, each of which is operatively juxtaposed and aligned with an adjacent cooperating field core 70A, 70B and 70C, respectively. Each slotted stator core 110A, 110B and 110C is comprised of high permeability, soft magnetic material such as laminations of 3% silicon steel. The slotted stator cores have cylindrical outer surfaces which are coaxial with shaft 44, with a small clearance space between such surface and the aligned co-operating cylindrical faces 75 of the field cores. In the slots of the stator cores 110A, 110B and 110C are disposed windings which are generally indicated as 114 in FIG. 1. However, the windings in the stator cores are unusual in number, arrangement and function, and a fuller description will be given subsequently, particularly with reference to FIG. 2 where they are shown and will be described in greater detail.

The slotted stator cores have spacers 115 between each other and a spacer 116 is present on top of core 110C. Disposed on spacer 116 is a slotted exciter stator core 118 which is operatively juxtaposed and aligned with the exciter field core 80. Exciter windings 120 are placed in the slots of exciter core 118 and are so arranged that when the exciter field core 80 with layer 84 of permanent magnetic pattern passes with respect to it, there will be generated an A.C. potential, preferably three phase A.C. of a high frequency. This is secured by providing a large number of successive north and south magnetic poles in layer 84, and arranging the windings 120 in the slots of the exciter core, so that the frequency output of the exciter 120 at the rotational speed of the shaft 44 is a substantial number of times greater than the desired frequency of the main A.C. output to the load. For example, if the desired main A.C. output is 60 Hz, then the exciter stator windings should generate three phase A.C. of the order of from 400 Hz to 1800 Hz, for reasons to be set forth later.

In order to fasten the several stator cores rigidly on the tubular sleeve 102, a retainer plate 122 is welded to the tubular sleeve and carries three long bolts (not shown) which pass through the holes 202 (FIG. 2) in the four cores 110A, 110B, 110C and 118 and extend through holes in the ring plate 109, so that when nuts are applied underneath the ring plate 109 and tightened, the bolts will clamp the ring plate 109, the four cores and the spacers 115 and 116 into a rigid unitary assembly, suspended from the retainer plate 122.

In order to bring electrical leads to the windings 114 and 120, several slots or channels (not shown) are provided in the stepped support 92 and from thence the leads are passed in pairs through the peripheral slots in exciter core 118, and then through some of the slots in stator cores 110B and 110C. No leads extend beyond core 110A. A bundle of leads 130 is shown in FIG. 1 which extends from the generator 30 to an electrical control means 132, as well as load output leads 134 being present which are connected to the electrical apparatus to which it is desired to supply three phase A.C. potential of selected substantially constant frequency and voltage.

Stator Core Windings

Figure 2:
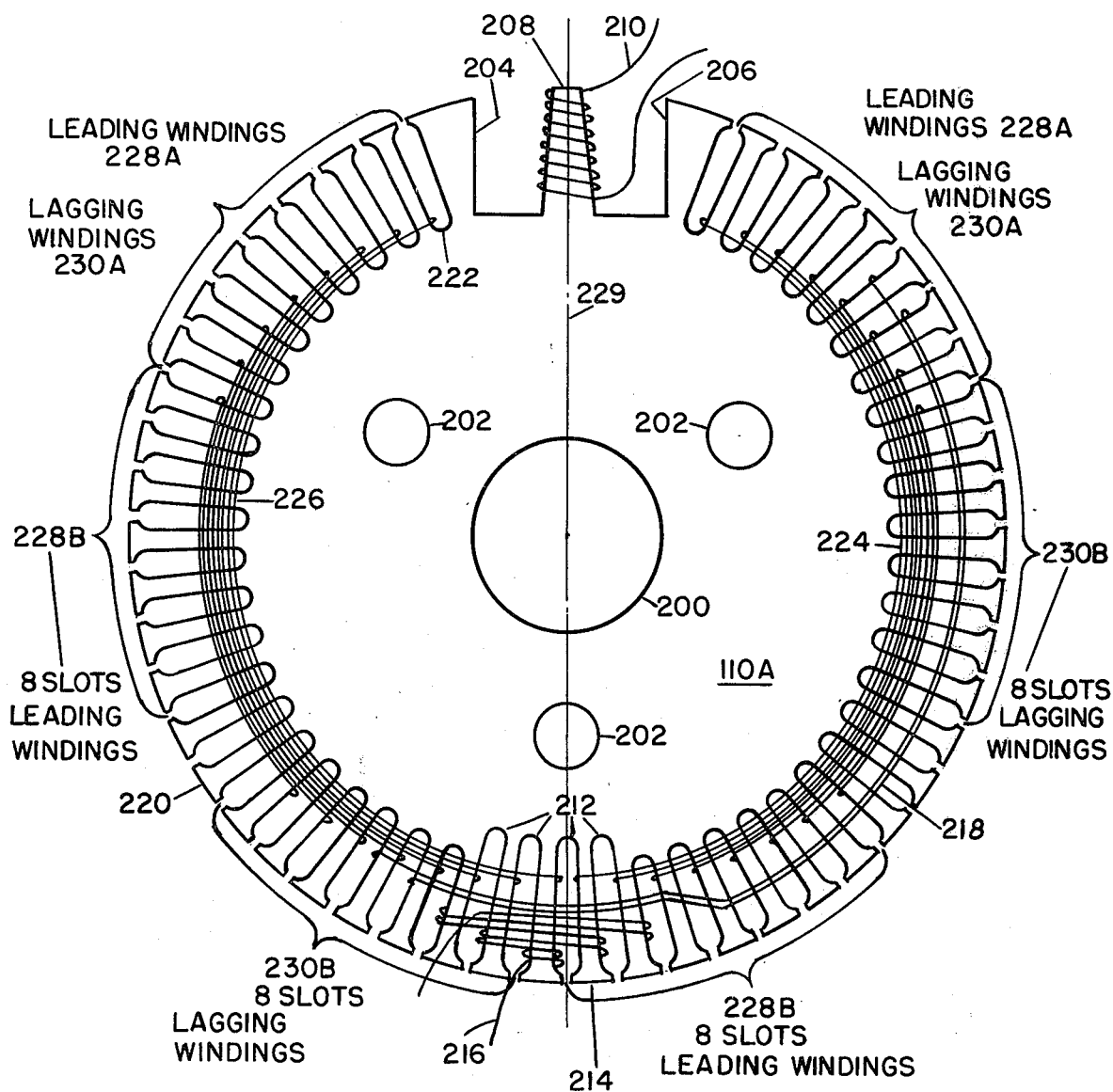
FIG. 2 is a plan view of a stator with windings.

Reference should be had to FIG. 2, wherein is shown a plan view of the stator 110A with its several windings and coils. Stator cores 110B and 110C are similarly constructed and wound. The core 110A comprises, for example, a stack of punched laminations of 3% silicon steel of high permeability having the unusual configuration of notches or slots and teeth as depicted. Each lamination of the core 110A has a large central aperture 200 which fits snugly around the tubular sleeve 102. A series of small holes 202, usually three being sufficient, are present to facilitate alignment of the laminations in a punch press for punching out the differently shaped notches, to enable the several laminations to be assembled and stacked into a solid core, and to admit the long bolts previously mentioned to hold the core 110A as well as the other cores, in a rigid assembly from plate 122 in the generator.

At the top of the stator core 110A, as viewed in FIG. 2, are two large slots 204 and 206 on either side of a relatively large tooth 208 around which is disposed a large excitation coil 210. The electrical control means 132 supplies a specific A.C. potential derived from the exciter windings 120 to the excitation coil 210. When so energized the excitation coil 210 will develop at peak amperage, a high magnetic flux at the relatively narrow area of tooth 208, which will magnetize to saturation, or other high flux level, selected immediately adjacent areas of the permanent magnetic material in layer 74A of the field core 70A as it rotates about the stator 110A. An important feature of the invention is to provide this narrow intense, magnetic flux field for reasons of effectiveness and high efficiency of operation of the generator 30. By the functioning of the excitation coil 210, there is developed in layer 74A a desired north and south magnetic pole pattern in the permanent magnetic material, with an initial remanent magnetic flux density close to the saturation or $B_r$ of the magnetic material. Thus the excitation coil 210 and tooth 208 constitute a magnetic writing head operating on the magnetizable permanent magnetic material in layer 74A, which can change any portion of a previously applied magnetic pole to any desired flux density level, determined by the current in coil 210, from saturation in one polarity to saturation in the opposite polarity.

At a point spaced from the excitation coil 210, and preferably diametrically opposite to tooth 208, are at least one pair of slots 212 of intermediate length, four being shown in the drawing, with at least one tooth 214 therebetween, with a modifying winding 216 disposed with most of its turns about tooth (or teeth) 214, but permissibly with some turns also disposed in the immediately adjacent smaller slots 222 and surrounding teeth 220. There may be four or more slots 212 of intermediate length in order to accommodate all the windings. The electrical control means 132 supplies alternating electrical current in a timed relation and in a precisely determined amount to modifying winding 216, usually in an amount to develop a lower magnetic flux density at teeth 214 than at tooth 208, so that as the previously magnetized layer 74A passes by tooth or teeth 214 it will slightly demagnetize the magnetic north and south magnetic poles present in layer 74A to a desired, usually lower, remanent magnetic flux density. By so controlling the remanent flux density of the previously imprinted permanent magnets in layer 74A, the potential that they induce in the primary output windings in stator core 110A is maintained at a controlled desired value. The modifying windings can be at other locations than at the point diametrically opposite to the excitation coil 210, however, excellent results have been obtained when located as shown and described.

In order to supply more efficiently the necessary electrical current to excitation coil 210, a feedback or supplementing winding 218 is disposed in slots which are about 60° and 240° in a clockwise direction from tooth 208. The passing of the magnetized layer 74A, with respect to the supplementing winding 218, will induce therein an A.C. potential which is applied through a resonant or tank circuit incorporating the excitation coil 210 and a capacitor, and supplements the A.C. current applied by the electrical control means 132 to the excitation coil. Thus, in one practical embodiment of the invention, the control means 132 supplied about 2 amperes of electrical current derived from the exciter winding 120, while the supplementing winding 218 furnished from 4 to 6 amperes of current to the excitation coil.

Each wound main stator core (other than the exciter stator) has a two pole winding configuration provided by two sets of primary windings 224 and 226 which generate the main A.C. potential, the primary windings being wound into a majority of the small slots 222 as well as in slots 212. In one embodiment, one set of primary windings 224 are placed in the first eight slots 222 immediately to the right of the slots 204-206 and also pass through the first eight bottom slots extending counter-clockwise from the diametrical line passing from the excitation coil 210 to the slots 212, there being some eight intervening unfilled slots 222. The other set of primary windings 226 are placed in the first eight slots 222 to the left of the slots 204-206 and also being placed in the first eight slots at the bottom, extending clockwise from the diametral line passing through the excitation coil and the slots 212. The emplaced windings 224 and 226 are mirror images in a vertical plane. As the field cores with their layers 74A, 74B and 74C magnetized to a north and south pole pattern rotate about the stator cores 110A, 110B and 110C, they will induce an A.C. potential in the primary windings 224 and 226 of a substantially constant voltage and of a substantially constant frequency with only a moderate amount of total harmonic distortion, and is eminently suitable for many applications in commerce and industry. Each set of primary windings in each core produces single phase A.C. potential, and the stators are so arranged radially on tubular sleeve 112 that the excitation coils are 120° apart with respect to each other, and that each stator's A.C. output is 120° out of phase with that of each of the other two stator's output. By simply employing a common neutral lead and three leads to each of the sets of primary windings, a three phase A.C. output is obtained.

However, for many demanding applications it is desirable to have a main A.C. potential output from the generator 30 with low total harmonic distortion. In order to accomplish this, there are disposed both leading windings 228 and lagging windings 230 is selected positions in each of cores 110A, 110B and 110C. As mentioned earlier, appreciable benefits are obtained in improved total harmonic distortion if only the leading or the lagging windings are used.

Referring to FIG. 2, the placement of the leading windings 228 in the specific core configuration there shown, is in the following manner: One set of turns 228A is wound into the first eight successive slots 222 on both the right hand and left hand of the excitation coil 210. The other set of turns 228B is wound between the eight successive slots proceeding counter-clockwise from the eighth slot with turns 228A, and the eight successive slots preceeding in a counter-clockwise direction from the first bottom slot to the right of a diametral line 229 extending from the center of the excitation coil 210 to the slots 212. The lagging windings 230 are placed with one set of turns 230A being placed in the same eight slots on both sides of the excitation coil as those in which the turns 228A were placed. The second set of turns 230B are wound between the successive eight slots proceeding in a clockwise direction from the eighth slot on the right hand side from the excitation coil, and the eight successive slots in a clockwise direction from the first bottom slot to the left of the diametral line through the excitation coil 210.

When the field cores 70A, 70B and 70C with their magnetized layers 74 rotate about the wound stators 110A, 110B and 110C, the leading windings 228 in each stator will generate a single phase A.C. potential that leads the A.C. potential generated in the primary windings 224 and 226 of the same stator by an angle of about 112°, but it is in synchronism with the single phase A.C. potential of another stator. The lagging windings in each stator will generate single phase A.C. potential that lags by about 112° the single phase A.C. potential generated by the primary windings of the same stator, but it is in synchronism with the single phase A.C. potential generated by the primary windings of another stator, but not the same stator with which the leading windings are in synchronism. Thus the primary windings of each stator are connected in series with the leading windings of one other stator and the lagging windings of the third stator. The three combined single phase potentials of these synchronous outputs are complementary and result in an integrated sinusoidal voltage wave with very little harmonic distortion, substantially less than 5% being attainable. The number of turns of each of the windings in the slots is such that the leading windings and the lagging windings have an equal number and the primary windings have as many turns as the total turns of the leading and lagging windings, and the voltages generated in each winding is directly proportional to the turns.

Electrical Control Means

Figure 3:
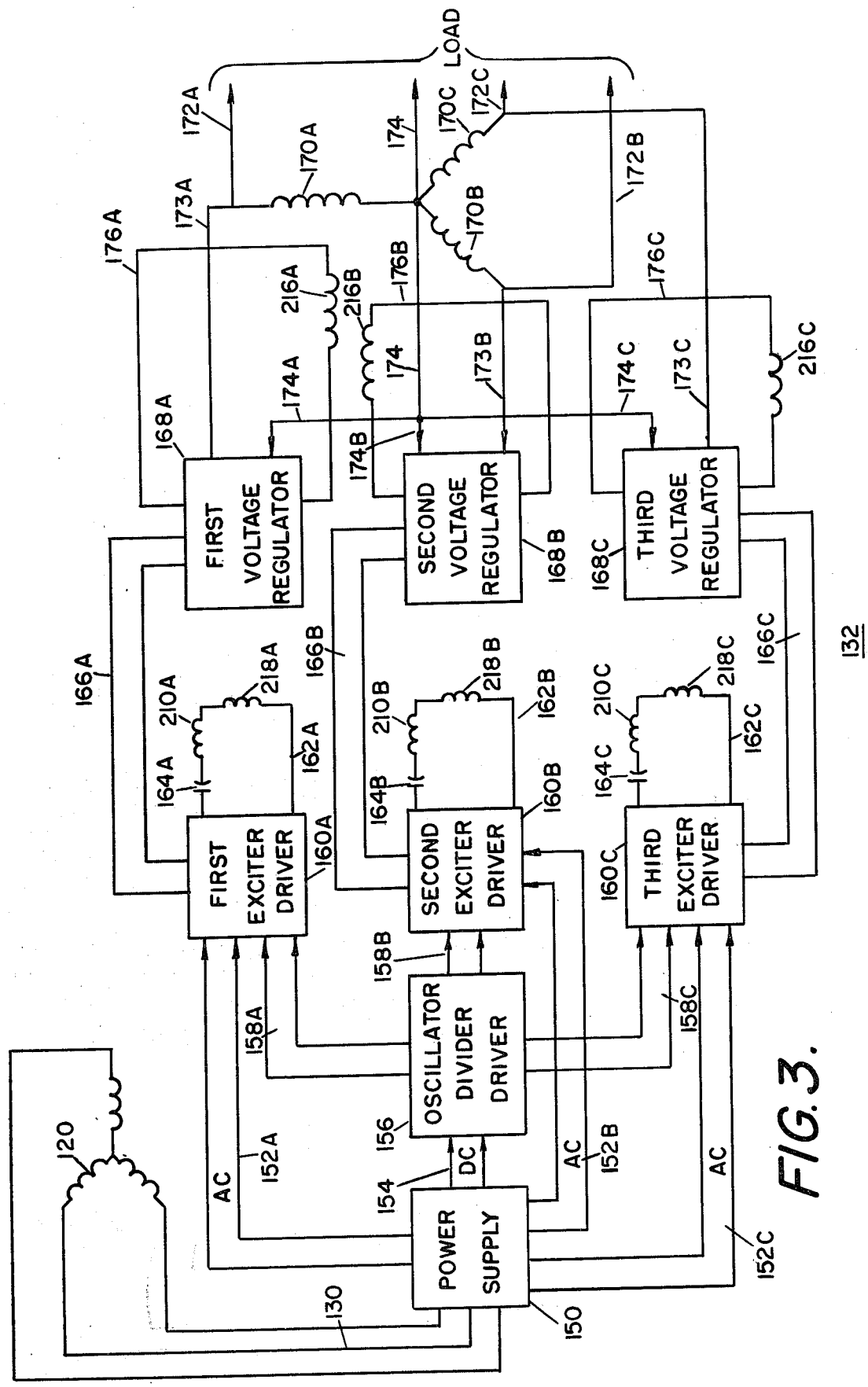
FIG. 3 is a block circuit diagram of the electrical control means.
Figure 4:
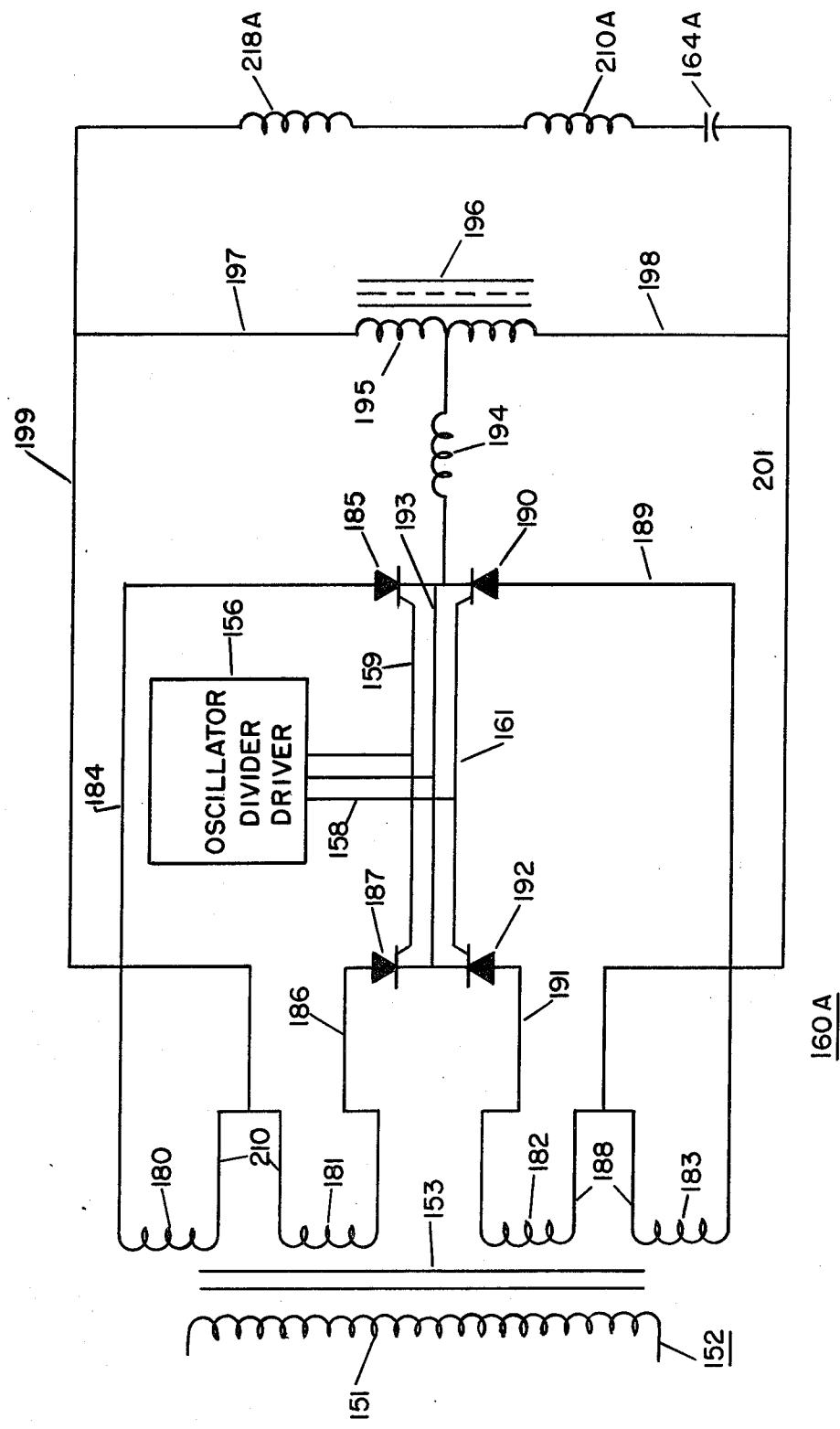
FIG. 4 is a circuit diagram of the exciter for a stator.

A circuit diagram of one form of a suitable efficient and reliable control means is shown in FIGS. 3 and 4. Referring to FIG. 3, A.C. potential developed in windings 120 of the exciter 118 is conveyed by leads 130 to a power supply unit 150. It is desirable that the frequency of the A.C. from the windings 120 be a substantial number of times greater than the desired frequency of the A.C. potential from windings 224–226. Thus, if the desired frequency from windings 224–226 is 50 Hz or 60 Hz, a suitable frequency from the exciter windings would be from 400 Hz to 1800 Hz. For a 60 Hz output from the primary windings 224–226, the power supply unit 150 rectifies a portion of, for example 600 Hz A.C., conveyed by the leads 130 and the direct current is carried by leads 154 to an oscillator divider driver unit 156. Also within the power unit 150 are a series of secondary coils coupled in transformer relation with primary coils supplied the A.C. by leads 130, and from the series of coils, A.C. potential is conveyed by leads 152A, 152B, and 152C to exciter driver units 160A, 160B, and 160C, respectively. Utilizing this A.C. potential, the first exciter driver unit 160A converts the high frequency A.C. to precisely 60 Hz single phase A.C. and supplies this potential by conductor 162A to the excitation coil 210A, which is in a resonant circuit (either in series or in parallel) with a capacitor 164A and the supplementing winding 218A. The second exciter driver unit 160B and the third exciter driver unit 160C are each connected in a resonant or tank circuit with their respective excitation coils 210B and 210C, capacitors 164B and 164C and supplementing windings 218B and 218C. The single phase A.C. potentials in these excitation coils 210B and 210C are 120° and 240° out of phase, respectively, with the A.C. potential in coil 210A.

A suitable oscillator driver divider 156 is the unit illustrated in FIG. 10b and described in column 8 and elsewhere in U.S. Pat. No. 3,931,535 issued Jan. 6, 1976.

In order to control the voltage in the A.C. output of the primary windings 224–226, and leading and lagging windings, if any, of generator 30, the first exciter driver 160A conveys an A.C. potential by line 166A to a first voltage regulator 168A. The voltage regulator 168A also receives, via lead 173A and common neutral 174A, the electrical A.C. potential from an output winding 170A, which latter schematically represents the totality of the windings 224, 226, 228 and 230 which are in series with each other, and the regulator compares in known manner the two voltages. The voltage regulator shown in FIG. 10d of U.S. Pat. No. 3,931,535 and described in Column 9 and elsewhere in this patent, may be employed for regulators 168A, 168B and 168C. If the voltage generated in output winding 170A is higher than desired, that is greater than in line 166A, then the voltage regulator 168A functions to transmit by conductors 176A sufficient amperage to modifying windings 216A to generate a demagnetizing flux at teeth 214. This is sufficient to demagnetize the north and south poles in layer 74A to a remanent flux density level that will generate in the windings 170A the desired A.C. potential. Similar voltage regulation is effected by the voltage regulators 168B and 168C. Consequently, the conductors 172A, 172B and 172C will furnish three phase A.C. of a substantially constant voltage and frequency to the ultimate load.

Details of the circuitry of the exciter driver unit 160A are shown in FIG. 4. 600 Hz A.C., for example, conveyed by leads 152 from the power supply unit 150, energizes a transformer unit having a winding 151 and a magnetic core 153 coupled with windings 180, 181, 182, and 183 of the exciter driver unit, so as to furnish A.C. for the excitation coil 210A of the first stator core 70A. The transformer windings have a center tap 210 and one outer connection 184 which thereof carries A.C. from winding 180 to a silicon controlled rectifier (SCR) unit 185, while another outer connection 186 from the winding 181 leads to a second SCR unit 187. In parallel fashion, windings 180 and 181 182 and 183 have a center tap connection 188 while an outer connection lead 189 carries current from winding 184 to a third SCR unit 190, and another outer connecting lead 191 carries A.C. from the winding 182 to a fourth SCR unit 192. The four SCR units 185, 187, 190, and 192 are provided with suitably timed 60 Hz gating electrical pulses from the oscillator divider driver 156, by leads 158 connected to the gating terminals of the SCR units. In operation when producing a 60 Hz A.C. output, a common conductor 193 of the four SCR units receives in each 1/120th of a second, a wave of one polarity comprising a plurality of successive rectified half cycles of positive and negative 600 cycle potential with a small interval of no potential between successive 60 Hz half cycles. An appreciable zero potential interval between each half cycle is desirable in order to assure proper rectification of the 600 Hz by the SCR units. In order to eliminate or reduce high frequency transients, such as spikes or other undesirable potentials, the rectified current in conductor 193 is in circuit with an inductance 194 connected to the center tap of a winding 195 of a choke transformer with an air gap 196. The 60 Hz current flows from the winding 195 by leads 197 and 198 to the excitation coil 210A and supplementing winding 218A connected in a resonant (series or parallel) circuit with a capacitor 164A. The circuit to the center taps 210 and 188 respectively, is completed by leads 199 and 201.

While FIG. 4 shows a circuit using SCR units, it will be understood that other equivalent semiconductor devices may be substituted by one skilled in the art. Thus, transistors and similar semiconductor devices that can be precisely controlled to conducting and non-conducting states, can be employed to produce the desired A.C. in the circuit of FIGS. 3 and 4.

Figure 3A:
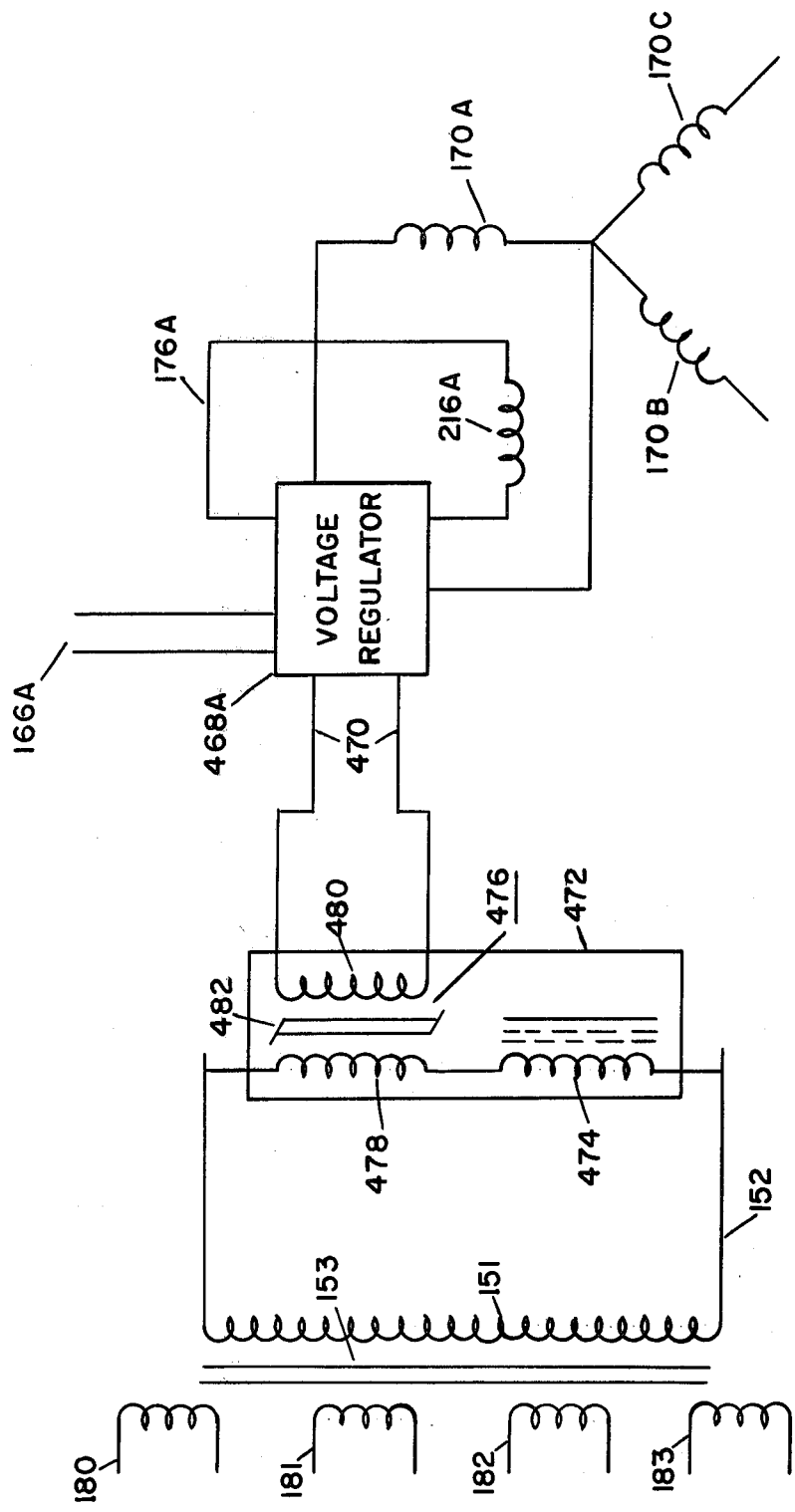
FIG. 3A is a circuit diagram of a modified circuit applied to a single stator.

Referring to FIG. 3A, there is shown a modified voltage regulator circuit. In FIG. 3, the first voltage regulator 168A supplied regulating potential only to the modifying windings 216A, in order that these windings effect an appropriate change in the initial remanent magnetic flux in the layer 74A. In the modification of FIG. 3A, a first voltage regulator 468A, energized by a potential received from the first exciter driver through lead 166A, supplies a first regulating A.C. voltage by conductors 176A to the modifying windings 216A and thereby effects a prompt change in the initial remanent magnetic flux in layer 74A, of the field core 70A of FIG. 1. The voltage regulator 468A also supplies a second regulating A.C. voltage by conductor 470, to a shunt reactance unit 472 disposed across leads 152, which carry A.C. potential from the exciter windings 120. The shunt reactance unit 472 may comprise an inductance coil 474 and a magnetic amplifier coil unit 476, which latter comprises two coils 478 and 480 with an interposed magnetic core 482, and operates in well known fashion. When A.C. potential is applied from the regulator 468A to coil 480, it will vary the reactance of the coils 474 and 478 and this in turn, in known manner, will vary the voltage being delivered by leads 152 to coil 151. Thus, by means of the shunt reactance 472, the voltage in coil 151 is easily and closely controlled at a selected level by the regulator 468A. As a consequence, the voltage developed in coils 180, 181, 182, and 183 also will be at a selected level, so that the excitation coil 210A is supplied a sufficient A.C. amperage to enable the coil to magnetize the layer 74A to a desired initial remanent magnetic flux density, which will induce in the windings 114 in the first stator, a potential very close to, if not exactly at, the desired output voltage of the generator 30. When required, the regulator supplies, by conductors 176A, a small correcting A.C. potential to the modifying winding 216A, which in effect causes an immediate fine control of the remanent magnetic flux in layer 74A, and this brings the voltage output induced in windings 114 to the desired value.

The use of a shunted reactance across leads 152, which responds to the regulator 468A, is only one means of controlling the voltage in line 152 from the exciter windings. Alternatively, there may be inserted in series in line 152, a variable reactance unit (for instance a resistance operable by a motor) responsive to signals from the regulator 468A to increase or decrease the reactance in line 152 and thereby correspondingly change the potential being delivered to coil 151 so that coils 180, 181, 182, and 183 have the exact potential necessary to properly energize excitation coil 210A, so as to produce the required initial remanent magnetic flux density in layer 74A.

Figure 5:
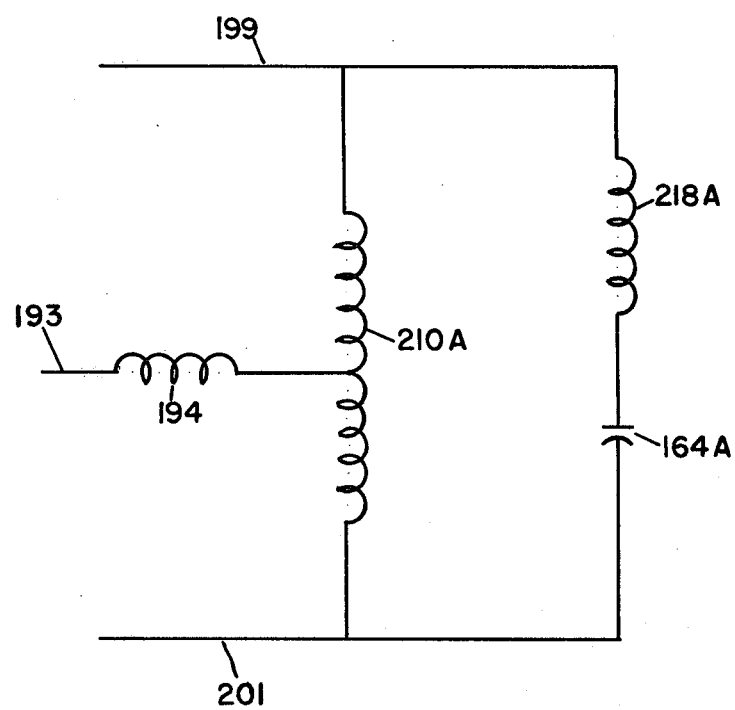
FIG. 5 is a circuit diagram of a modification of a portion of FIG. 4.

Since there will usually be few undesirable electrical transients flowing in the conductor 193, in many cases there will be no need to employ the choke transformer 195 of the FIG. 4 circuit. In FIG. 5, is shown a modification, wherein the lead 193 of FIG. 4 conveys the 60 Hz current to the inductance 194 which is connected to a center tap in excitation coil 210A, while to the outer ends of the excitation coil are connected the supplementing winding 218A and a capacitor 164A in a resonant circuit, with leads 199 and 201 also being connected thereto to complete the circuit.

Figure 6:
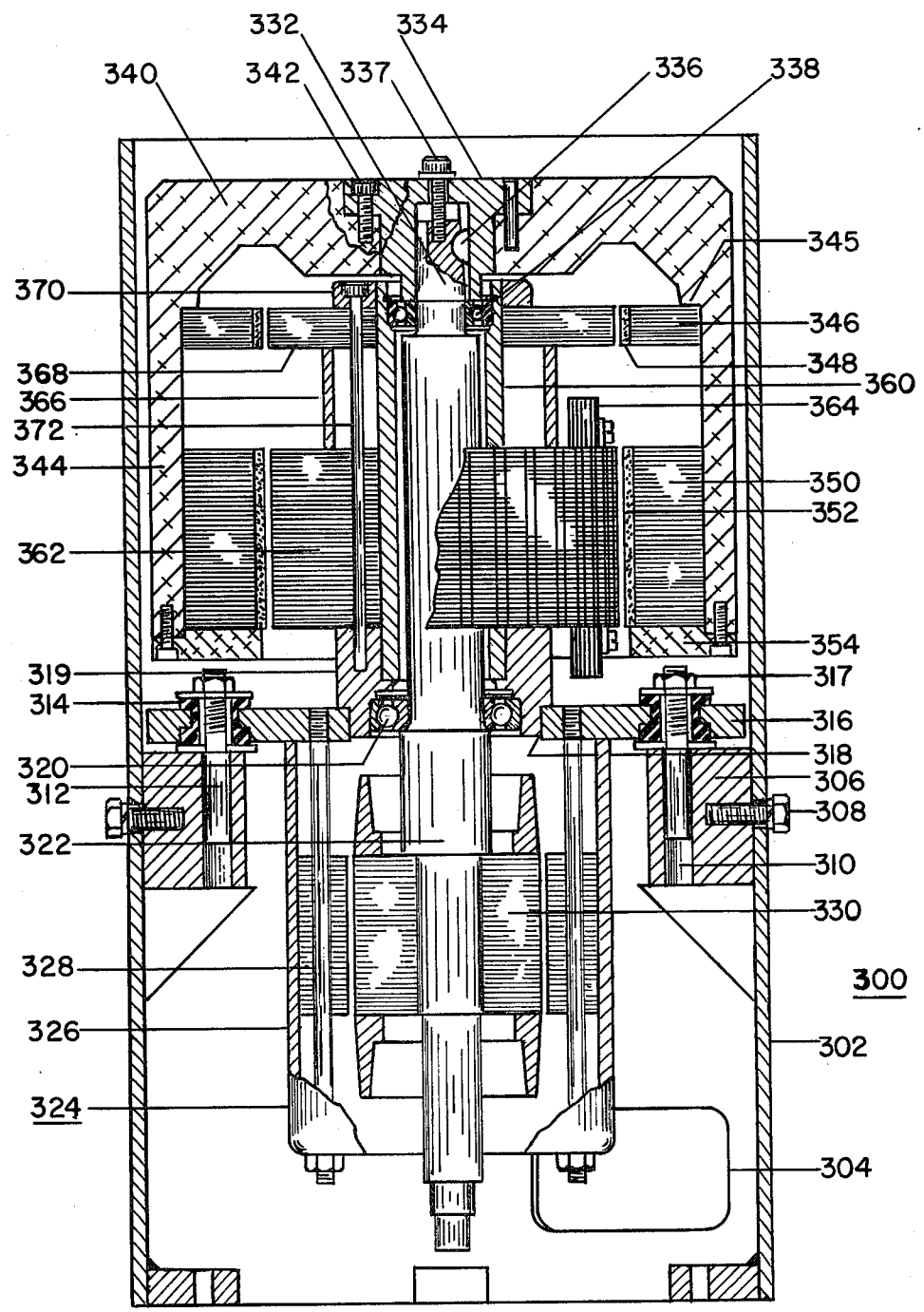
FIG. 6 is a vertical cross-section through a modified motor-generator unit.
Figure 7:
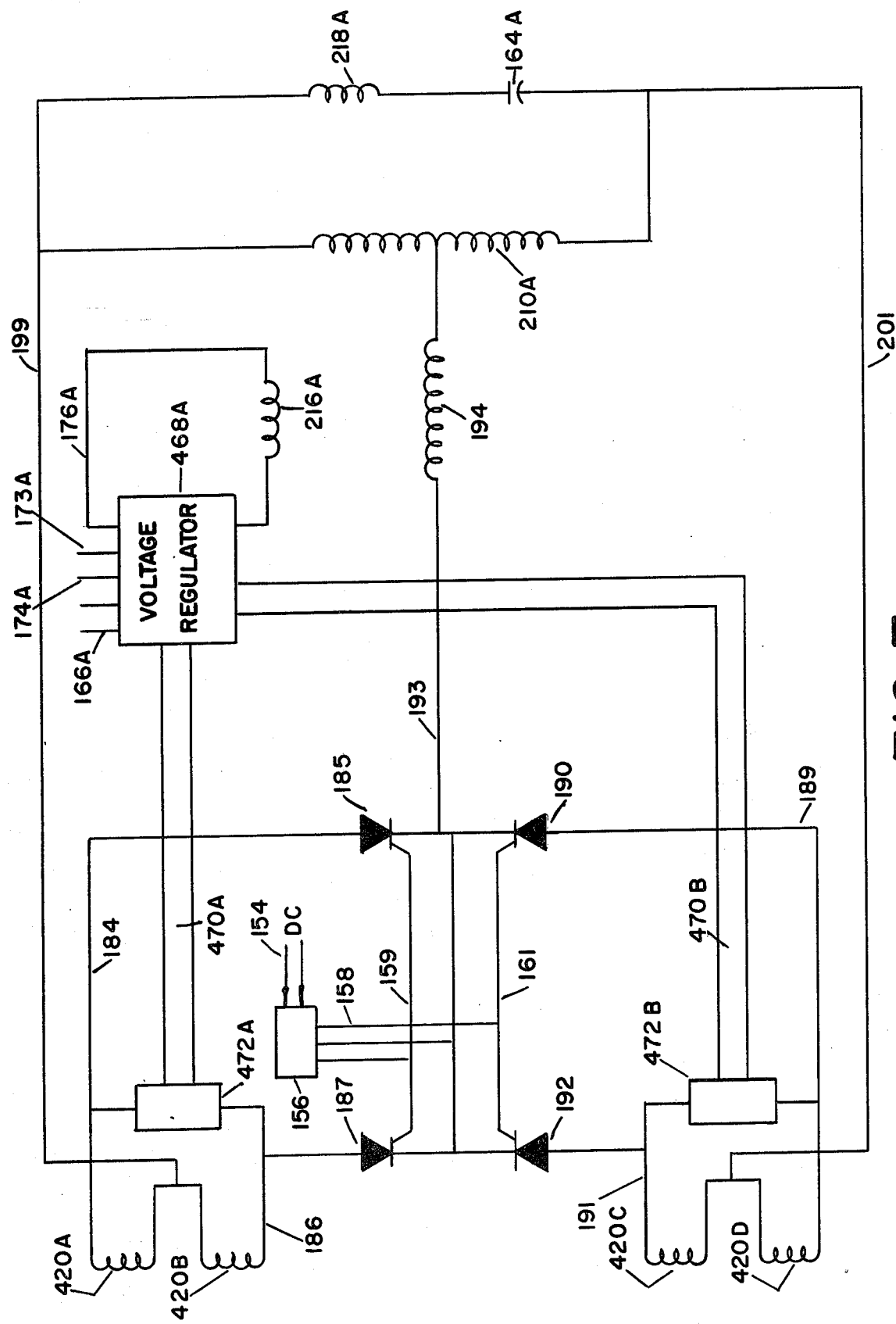
FIG. 7 is a circuit diagram of a modified electrical control system applied to a single stator.

Referring to FIG. 7 of the drawing, there is shown a modified form of the invention, wherein the exciter windings, as well as the electrical control means, are also modified. In this form of the invention, there are as many sets of exciter winding phases as there are phases of A.C. potential to be generated by the generator 30. Thus, if the generator 30 is to produce a single phase A.C., then there is only one phase winding in the exciter stator 368, as shown in FIG. 6, while for a three phase output by generator 30, as is shown in FIG. 1, there are three winding phases 120 in the exciter stator 118. Further, each of the winding phases in the exciter corresponds to the number of the power output stator cores in the generator 30, that is, one for each of the stators 110A, 110B and 110C in the three phase generator there shown. Each of the phase windings in the exciter stator comprises a plurality of pairs of separate coils, four coils preferably forming each phase winding, and each coil is so wound that it generates the same voltage as the other coils. These four coils forming a single phase winding are shown as coils 420A, 420B, 420C and 420D in FIG. 7. Each of the coils has a pair of conductors extending from the exciter to the electrical control means, namely 184 and 199 for coil 420A, 186 and the common lead 199 for coil 420B, while conductors 191 and 189 and common lead 201 come from coils 420C and 420D. A small rectifier (not shown) is connected to the coils to provide through conductor 154, the small amount of direct current needed to power the oscillator divider driver unit such as 156.

One of the conductors from each exciter coil is connected to the input terminal of a controllable semiconductor such as a gated rectifier, for example an SCR unit. In FIG. 7, conductor 184 is connected to SCR unit 185, 186 is connected to SCR unit 187, 189 is connected to SCR unit 190, and conductor 191 is connected to SCR unit 192. The SCR units are connected to gate leads 159 and 161 which are supplied timed gating signal pulses from the oscillator divider driver 156 via leads 158 and 159, so that the high frequency A.C. from the four exciter coils is converted to lower frequency A.C., corresponding to the desired frequency of the generator 30. Each of the lower frequency cycles comprises alternate positive and negative pulses, wherein each pulse comprises a series of full waves of rectified high frequency A.C. derived from the coils 420A, 420B, 420C, and 420D. The output terminals of the four SCR units are connected to conductor 193, which conveys the low frequency A.C. so produced to an inductance 194 and thence to the excitation coil 210A, which is connected in a resonant circuit with a capacitor 164A and the supplementing winding 218A. The excitation coil 210A magnetizes the layer 74A into the pattern of magnetization with an initial remanent magnetic flux density.

A voltage regulator 468A, supplied with power by leads 166A from the first exciter driver, receives voltage indications from leads 173A and 174A, from the output windings 170A of generator 30, and senses any departures from the desired selected voltage. If there is any such departure from the selected voltage, the voltage regulator sends a correcting A.C. signal by conductors 470A and 470B to shunt reactance 472A, shunted across the leads 184 and 186, and shunt reactance 472B shunted across leads 189 and 191. The reactances are similar to the shunt reactance 472 in FIG. 3A. The shunt reactances 472A and 472B cause the A.C. potentials generated in coils 420A, 420B, 420C and 420D to be correspondingly increased or reduced, and this in turn causes the A.C. potential to be similarly increased or reduced in the excitation coil 210A, which thereby changes the initial remanent flux density in the layer 74A and this in turn increases or reduces the voltage in the output windings 170A.

Concurrently, the voltage regulator 468A sends appropriate signals to the modifying coil 216A by leads 176A, to effect a prompt change in the initial remanent magnetic flux density of the layer 74A.

It will be understood that there will be equivalent electrical control assemblies as shown in FIG. 7 for each phase of the generator 30. Consequently, there are three such assemblies for a three phase generator with, of course, a single oscillator divider driver unit.

It will be understood that the positions of the field cores and the stators can be reversed, so that the field cores with cylindrical outer surfaces can be mounted directly on shaft 44, while the stators can be placed in a stationary cylindrical shell, the stators having a cylindrical aperture which surrounds the field cores. The inertia of the rotating mass is less in this arrangement than in the structural configuration of FIG. 1, so that the rotating mass will lose more speed per unit of time when power to motor 28 is interrupted. The FIG. 1 configuration has a relatively long coasting time per unit increment of speed loss, and this is a desirable property. In one NIPS unit constructed as shown in FIG. 1, the field core rotor took 10 seconds to lose 10% of its normal running speed of 3550 rpm, and it still delivered 60 Hz A.C. at full voltage for longer than this period when the motor was without power.

It is ordinarily preferred that the wound stators or armatures be stationary, since this eliminates any need for brushes or slip rings to supply electrical current to the windings and to bring generated current out to the load.

Standby Auxiliary Power

Referring to FIG. 1, conductors 250 connected to utility line 14 supply electrical potential to a sensor and delay unit 252, which is suitably programmed to sense any fault, such as abnormally low voltages in line 14 or total interruptions of A.C. therein. A time delay mechanism, which is preset to function after this fault in line 14 continues for more than some 2 to 5 seconds, then sends a control signal by leads 254 to the transfer switch 16, to cause it to disconnect line 14 from the line 18 leading to the motors 24–28, and at the same time, or earlier, the sensor transmits a control signal to a standby engine unit 256, by leads 258, to cause a starter to function on the engine 256. In about five seconds the engine unit 256 will have reached full speed and will drive an A.C. generator 260 connected to it, to produce sufficient A.C. to be able to operate motor 28. The transfer switch 16 will receive this A.C. power from generator 260, from conductors 262 which it connects into line 18. In a total elapsed time of less than 10 seconds since line 14 had a fault or interruption, the standby engine unit 256–260 will provide full power to the generator 28, so that it will resume operating at normal speed. Up to this moment, the inertia of motors 24 and 28 and generator 30 was being employed to supply the desired A.C. into the line 134. In units for commercial use, in ten seconds they will lose less than 10% of their speed. However, the output A.C. will show no appreciable variation in voltage or frequency.

The sensor and delay unit may be energized by a separate battery, but can be easily energized by electrical power furnished by leads to the output line 134. Similarly, the engine unit can employ a storage battery to energize its starter, but conveniently can also be supplied with electrical current drawn from leads 134. This eliminates the problem of battery maintenance. The generator will supply the modest requirements of a starter without a noticeable change in the voltage output.

When utility power is restored to lines 14, the sensor and delay unit will signal transfer switch to reconnect line 18 to line 14 and simultaneously disconnect the conductors 262 from line 18. Engine unit 256 will be shut down at the same time.

Further, a diesel engine or a gasoline engine can be coupled directly with the shafts of the motors 24–28 through a magnetic clutch. The magnetic clutch normally disconnects the motors 24–28 from the engine, as long as electrical power flows from line 14. However, on interruption of electrical power in line 14, the electrical controls will energize the magnetic clutch, possibly after a timed delay of a second or more in case the power interruption is only momentary, and the rotational energy of the motors 24–28 and generator 30 will cause the diesel or gasoline engine to turn over and operate in a matter of a second or so. The engine will pick up speed rapidly, and in a few seconds it will be directly driving the motors 24–28 and generator 30 a desired speed of, for example, about 3600 rpm. During this period from line power interruption until the engine is operating at full speed, the generator 30 will be producing A.C. potential at 60 Hz and constant voltage.

It will be understood that fuses and circuit breakers will be applied to lines 14 and elsewhere to protect the equipment and relays in case of excessive or dangerous voltage conditions. Lightning arrestors can also be connected into the lines 14 for safety and to prevent damage.

Referring to FIG. 6, there is shown a modified generator unit 300, having a single output stator and an exciter capable of furnishing single phase A.C. potential of substantially constant frequency and substantially constant voltage, to a load needing electrical energy of this type. Many control systems are adequately powered by such single phase A.C. providing it is of a selected constant voltage and frequency. The electrical control means described and shown in FIGS. 3,4,5, and 7, when applied to the FIG. 6 modification, will enable this desired single phase A.C. to be produced, using of course, the control means applied to a single stator such as 110A.

The generator unit 300 comprises a cylindrical casing 302, provided with cooling air inlet openings 304 at its lower end, with a plurality of support blocks 306 applied by bolts 308 to the inside walls. Each support block 306 has a vertical cylindrical bore 310 into which a shouldered pin 312 fits firmly, with the upper end of each pin 312 fitted with an elastomeric grommet 314 adapted to receive an apertured support plate 316, and held in place by a nut 317 threaded onto pin 312. In plate 316 is a large central opening 318 into which is welded the lower end of a large collar 319. The collar 319 has a recess at its bottom end into which is press fitted a ball bearing 320, the inside race of the bearing supports a shaft 322 connected at its lower end to an induction motor 324. The motor 324 comprises a motor frame 326 affixed to plate 316, as by bolting, inside of which is a field winding and magnetic core 328, while its rotor 330 is affixed to rotate shaft 322. The upper end of shaft 322 has a coned terminal 332 fitting into a mating conical aperture in a hub 334 and both are non-rotatably joined by a key 336 and bolt means 337. An upper ball bearing 338 is applied to the shaft 322 just below coned terminal 332 thereof, with the outer race of the bearing being supported within a shouldered recess in the upper end of a large cylindrical sleeve 360, welded or otherwise united rigidly at its lower end to collar 319. To the hub 334 is a heavy disk member 340 fastened by bolts 342. The disk member 340 has heavy cylindrical walls 344 extending downwardly from its rim, with an internal shoulder 345 where they meet. Pressed against shoulder 345 is an exciter field core 346 of soft magnetic material, as for example, laminations of silicon steel, having an internal cylindrical aperture with a layer of permanent magnetic material 348 magnetized in a series of north and south poles. A spacer sleeve (not shown) abuts the bottom face of field core 346 and extends a distance downwardly where it meets a power field core 350 of a soft magnetic material, which may be of laminations of silicon steel also. The power field core 350 has a cylindrical surfaced aperture on which is applied a layer 352 of magnetizable permanent magnetic material such as barium ferrite. A retainer plate 354 is bolted to the lower end of the cylindrical wall 344 and bears against the bottom face of the power field core 350, thereby clamping the cores 346 and 350 firmly in place within the walls 344.

Disposed about sleeve 360 and resting on the upper face of collar 319 is a slotted wound stator core 362, with an excitation coil 364 placed in two slots thereof, and primary, modifying and supplementing windings disposed in other slots. A spacer sleeve 366 placed on the upper face of core 362 spaces an exciter stator 368, which is slotted and carries exciter windings. The stators 362 and 368 are juxtaposed and aligned with the field cores 350 and 346 so that each one is operatively and functionally associated with respect to the magnetic fields set up by the layers 352 and 348 of permanent magnetic material. Both of the stators 362 and 368 are of soft magnetic material such as laminations of silicon steel. A retaining collar 370 is applied to the upper face of stator 368, and several long bolts 372 are passed through holes in collar 370, the stator cores 362 and 368 threadedly engaged at their lower ends in collar 319, and nuts are applied to their upper ends so that nuts can be turned to form a rigid assembly of the stator cores about sleeve 360.

In operation of the FIG. 6 device, the motor 324 rotates the shaft 322 and the attached disk member 340-344, with its exciter field core 346 and main field core 350 thereon at a high speed about the stationary stators 362 and 368. The windings in the exciter stator 368 generate A.C. as they cut through the magnetic field set by the permanently magnetized layer 348 on field core 346. The excitation coil 364 in the main stator 362 is supplied A.C. of a frequency of 50 Hz or 60 Hz, for instance, by the electrical control means in the manner described and shown in FIGS. 3, 3A, 4, and 5, and will magnetize layer 352 into a pattern of north and south magnetic poles at an initial remanent magnetic flux density so that the primary windings will generate A.C. of the identical frequency supplied the excitation coil. The supplementing windings in stator 362 are connected to supply a portion of the energizing A.C. in a timed relation to the excitation coil 364, while the modifying windings in stator 362 are energized by the electrical control means to change, if necessary, the remanent magnetic flux density in the layer 352 to a level that will cause the primary windings to generate a voltage of precisely the desired value. Accordingly, the output of the primary windings in stator 362 will be single phase A.C. of a substantially constant frequency and selected voltage.

In the devices of FIGS. 1 and 6, the excitation coil functions to imprint a pattern of north and south magnetic poles in the layers of permanent magnetic material, as in layer 74A, for example. If the field core is rotating at 3600 rpm and the desired output of the generator is 60 Hz A.C., then the magnetic pattern in layer 74A would simply be retraced at each revolution when the stator is wound in a two pole configuration. However, a typical 60 Hz induction motor will normally rotate at about 3500 rpm at full load, and because the excitation coil 210 is being energized with precisely 60 Hz, the polarity of the excitation coil will change at about 10° before the end of a trailing edge of each given pole pattern previously imprinted in layer 74A. The excitation coil applies a sufficiently strong magnetic field to the layer at this point, so that it will cause the polarity of this nearly 10° increment of the trailing edge to be reversed to the opposite polarity and this increment will be added to the leading edge of the succeeding pole in layer 74A. Accordingly, the excitation coil will keep reversing increments of about 10° from each trailing edge and add it to the immediately following leading edge of the succeeding pole. Thus, the excitation coil in effect speeds up the relative movement of the north and south pole pattern of layer 74A by 10° per revolution of the rotor, to cause the pattern to pass the primary windings at a relative speed of 3600 rpm, and the windings will generate A.C. of exactly 60 Hz if the excitation coil is energized with 60 Hz A.C. Regardless of the rotor speed variations, within quite substantial limits, the excitation coil will imprint magnetic pole patterns in the layer 74A so that 60 pairs of poles pass by the primary windings each second, thereby inducing 60 Hz A.C. output. A 50 Hz induction motor supplied with 50 Hz A.C. will rotate at about 2900 rpm at full load, and if 50 Hz A.C. is desired from the generator 30 then the excitation coil is energized with 50 Hz from the control means, and it will imprint magnetic pole patterns in layer 74A in a similar manner, except that the pairs of north and south poles passing the primary windings will be at the rae of 3000 per minute and the primary windings will generate 50 Hz A.C. Any speeding up of the driving motor, or slowing down, is automatically compensated for by the fact that the excitation coil will imprint north and south magnetic poles at precisely the rate of the A.C. supplied to it, so that the primary and other windings are subject to a fixed rate of passage of magnetic poles at all times.

It is well known, to those skilled in the art, that considerable care and special equipment and precise timing is required to couple the outputs of two A.C. generators. An advantage of the present invention is that similar NIPS generators of this invention, which use a common timing oscillator, can be coupled in parallel by simply closing a connecting switch, without any concern, even though the generator speeds may be different, since their A.C. leads will have potentials with identical wave outputs. The only item that need be watched is that the correct phases be coupled.

A phase-lock loop component may be interposed between the oscillator of the NIPS unit and an external reference, such as utility power line, in order that they may function in synchronous phase relation, as long as the external reference is operating normally. Thus, if a factory or hospital is employing a plurality of the NIPS units for different functions—for example to operate electronic data processing units, and a machine tool—it is desirable that all the NIPS units operate in a synchronous phase relation. Therefore, a phase-lock loop component, which is available as a standard electronic component, will be applied to the oscillators of all of the NIPS units, using either the utility line as the external reference, or one of the NIPS units as a master reference.

The mass of the motors, cylindrical shell and the field cores attached thereto constitute a rotational energy source that is sufficient to provide an A.C. output from the unit, when power is totally cut off from the driving motors for a substantial period of time. This mass can be made quite large, so that the generator will keep on producing A.C. of the constant frequency—constant voltage desired, for up to a minute or more, though there are several practical considerations in providing generators of such long time output characteristics. It is more practical and economical to provide generators with modest masses so that they will deliver full A.C. output for up to 20 seconds, during which time they may lose from 10% to 15% of their normal rotational velocity, and this time interval is adequate for the period from the moment utility line power is interrupted until auxiliary power can be delivered to the generator.

While reference has been made to utility power and its shortcomings, which requires the interpositioning of the present NIPS system between the utility line and a sensitive load, it should be understood that there are many other situations that would be greatly benefited by use of the present NIPS system. For example, A.C. power is frequently generated locally in factories, offices and other small usage areas, using a diesel engine, gas or gasoline engines, or a steam turbine driving a small A.C. generator. Some of the problems and faults present in a public utility system are avoided by such local generator units, but there are other difficulties present; in many cases greater surges and voltage dips in these small units occur when a large motor or an electric furnace or other large load is suddenly put on the line. Failures of such local units at unexpected times can occur and it may take a long time to get another standby unit in operation or to tie into a utility line. In such occurrences sensitive computers and electrical controls are inoperative, or can misfunction or malfunction with considerable losses. The NIPS system of the present invention can be employed to great advantage in these local power generating circuits to isolate and insulate all electrically sensitive equipment from any fluctuations, faults and interruptions, and especially to keep the equipment operating under all circumstances.

An important application of the NIPS of this invention is to supply A.C. of a different frequency from the utility frequency, to a piece of electrical equipment requiring such different frequency. Thus, a computer designed and employing components functioning with 60 Hz A.C. can be used without any modification in an area where only 50 Hz A.C. is available, by interposing an NIPS generator as shown in FIG. 1. The driving motors 24 and 28 need be motors designed for 50 Hz A.C. while the generator is operated to produce 60 Hz A.C. output, which is supplied to the computer. Thus, not only is the computer supplied with the frequency for which it is designed, but it is also protected from any line faults, irregularities, or interruptions in the 50 Hz A.C. utility line.

Using barium ferrite, the thickness of the permanent magnetic material in the layer 74 is of the order of ¼ inch. The thickness may vary from 0.1 inch to 0.5 inch for fields in generators of from about 1 KW to 10 KW capacity. Using permanent magnetic materials having a higher remanent flux density ($B_r$) than barium ferrite, the thickness may be reduced proportionately, while a layer of weaker permanent magnetic materials may have to be thicker. The combination of this thin layer of permanent magnetic material applied to the face of a large mass of high permeability soft magnetic material, is an important factor in assuring low losses and a high efficiency generator.

I claim as my invention:

1. In a polyphase electrical generator capable of generating polyphase A.C. of a substantially constant selected frequency and a substantially constant selected voltage, in combination, a rotatable shaft having a coaxial cylindrical shell attached thereto, a plurality of field cores numerically corresponding to the phases of the polyphase current and an exciter field core attached to the interior surface of the cylindrical shell, all of the cores comprising high permeability soft magnetic material and having a central cylindrical coaxial aperture with a layer of magnetizable permanent magnetic material applied to the face of the coaxial cylindrical aperture of the first mentioned field cores, a layer of permanent magnetic material magnetized to a pattern of poles applied to the face of the cylindrical aperture in the exciter field core, support means maintaining the shaft and the cylindrical shell for rotation thereon, the support means having non-rotatably attached thereto an elongated member disposed about and coaxial with the shaft and extending into the cylindrical shell, a plurality of slotted wound stators attached to the elongated member, each stator having an outer cylindrical surface slightly smaller in diameter than the apertures in the field cores and being spaced on the elongated support means so that each stator is juxtaposed and operatively aligned with a field core, each stator core comprising high permeability soft magnetic material, the stator core opposite the exciter field core having exciter windings therein for generating an A.C. when the exciter field rotates, the remaining stator cores having a first pair of slots with an excitation coil therein, slots spaced from the first slots having a modifying winding therein, a supplementing winding being wound between slots at about 60° and 240° in a clockwise direction from the first pair of slots, and potential output windings being wound in slots to the right side and to the left hand side of the diametral line through the first pair of slots so as to form a two pole winding, electrical control means for supplying both exciting AC from the exciter windings and electrical AC from the supplementing windings to each excitation coil of such magnitude and in such timed relation that a narrow magnetic field of high flux density is produced to cause a patterned magnetic field with magnetic poles to be formed in the layer of magnetizable permanent magnetic material in each juxtaposed field core, the electrical control means also supplying electrical current to the modifying windings in such timed relation and of such magnitude that the magnetic field thereof will modify the pattern of the magnetic poles in said layer of magnetic material to provide for a remanent flux strength such that the potential output windings of each stator sweeping through said patterned magnetic field will generate single phase A.C. of the selected frequency and the selected voltage, the combined potential output of all of the stators, apart from that of the exciter field core, constituting the desired polyphase alternating current.

2. The polyphase generator of claim 1, wherein the potential output windings in each of the slotted cores of the stators, other than the exciter stator, comprise (a) sets of primary windings, of which one set is wound in slots on the right hand side of the diametral line passing through the excitation coil slots and the other set is wound in slots on the left hand side of the diametral line, the sets of primary windings in each stator core produce single phase A.C., (b) sets of leading windings being wound in slots other than the excitation coil slots, to produce single phase A.C. leading the A.C. of the primary winding of the same stator core by from about 110° to 115°, but such A.C. is in synchronism with the A.C. potential of another of the stators, and (c) sets of lagging windings being wound in slots other than the excitation coil slots, to produce single phase A.C. lagging the A.C. of the primary windings of the same stator core, but such A.C. is in synchronism with the A.C. potential of the primary windings of a third stator core, the primary windings of each stator being joined in series with the leading coil of another stator and the lagging coil of a third stator with which the A.C. potentials are in synchronism, the resulting A.C. being three phase A.C. with low total harmonic distortion.

3. The power supply system of claim 1 wherein the field cores are attached directly to the shaft and present an outer coaxial circular surface, the cylindrical shell is non-rotatably attached to the frame with the four slotted armatures being attached to its inside walls and each having an aperture with an interior surface of cylindrical coaxial configuration being placed in operative juxtaposition with the circular surface of one of the field cores, and the slots have the coils and windings as recited.

4. The polyphase generator of claim 1, wherein the exciter windings are so disposed in the exciter stator that during operation of the generator they generate high frequency A.C. potential, the exciter windings comprise a plurality of pairs of separate coils for each phase of the exciter and such exciter phases correspond to the number of phases generated by the polyphase generator, conductors from each separate coil going to the electrical control means with one of the conductors from each coil in a phase being connected to an input terminal of one of a group of gated semiconductor rectifiers, there being a group of gated semiconductor rectifiers for each exciter phase, a source of timed low frequency gating pulse signals connected to the gates of the rectifiers, the plurality of semiconductor rectifiers in each group being so connected with each other that their outputs produce full wave rectification of the high frequency A.C. inputs into low frequency A.C., of which each cycle comprises successive waves of the rectified high frequency cycles at one polarity followed by the opposite polarity, the lower frequency A.C. corresponding to the selected frequency of the polyphase generator, the low frequency A.C. being conveyed to the excitation coil of one stator which is thereby energized to cause the layer of permanent magnetic material in the juxtaposed field core to assume a pattern of magnetization at an initial remanent magnetic flux density, a controllable variable reactance being shunted across each pair of conductors connected to the input terminals of the gated semiconductor rectifiers, voltage regulator means responsive to any departure from the selected voltage of the A.C. voltage generated in the potential output windings of the stator when the stator moves with respect to the magnetized layer of permanent magnetic material to supply to the shunt reactances a modifying control A.C. potential of a magnitude to cause the A.C. potential generated by the exciter windings in that phase to be appropriately changed so that the low frequency A.C. output supplied to the excitation coil be changed, and thereby the initial remanent magnetic flux density in the layer of permanent magnetic material is changed to a level such that the voltage induced in the potential output windings of that stator are changed to the selected voltage, and said voltage regulator means also supplying A.C. to the modifying windings in the stator to effect an immediate change in the initial remanent magnetic flux density.

5. A three phase generator capable of generating alternating electrical current of a constant selected frequency and a substantially constant selected voltage, in combination, a support frame, a driving means on the support frame, a rotatable shaft with a hollow cylindrical shell attached thereto and supported by the frame for rotational movement by the driving means, three spaced field cores of high permeability soft magnetic material attached to the inner surface of the cylindrical shell, each field core having a central cylindrical aperture coaxial with the shaft with a layer of permanent magnetic material applied to the surface of the cylindrical aperture, a fourth exciter field core applied to the inner surface of the cylindrical shell, the exciter field core comprising high permeability soft magnetic material having a cylindrical aperture coaxial with the shaft and a layer of permanently magnetized hard magnetic material applied to the surface of the aperture, an elongated member supported by the frame and extending into the shell, four slotted stator cores of a high permeability soft magnetic material and each having an outer cylindrical surface smaller than and matching the cylindrical apertures in the four field cores, the four slotted stator cores being held by the elongated member so that each stator core is aligned in operative juxtaposed position with respect to a field core, the slotted stator core juxtaposed with the exciter field core having exciter windings in the slots for generating A.C. exciter potential when the permanently magnetized exciter field core rotates about it, each of the other three slotted stator cores having a first pair of slots with an excitation coil therein, at least one other pair of slots substantially diametrically opposite to said first pair of slots with a modifying winding therein, a supplementing winding placed in slots at about 60° and about 240° in a clockwise direction from the excitation coil, and potential output windings disposed in each stator, the potential output windings comprising (a) sets of primary windings of which one set is wound in slots on one side of the diameter passing through the excitation coil and the other set is wound in slots on the other side of said diameter, the primary windings in each of the three stator cores producing single phase A.C. potential in operation, and (b) sets of leading windings wound in slots other than said first pair of slots so as to produce single phase A.C. potential that leads the A.C. potential of the primary windings of the same stator by from about 110° to 115°, but the single phase potentials of the leading windings being synchronized with the single phase A.C. of another primary winding, the output leads of the primary winding of each stator being connected in series with the output leads of the leading winding of one of the other stators with which it is in synchronism, the combined potential outputs from the three potential output windings comprising three phase A.C. with low total harmonic distortion, electrical control means supplying A.C. derived from the exciter windings and A.C. from the supplementing windings to each excitation coil in such timed relation and of such magnitude that the magnetic field thereof will cause a pattern of magnetic poles to be formed with a high initial remanent magnetic density in each of the layers of permanent magnetic material in the said three spaced field cores juxtaposed to each of the stator cores whereby to generate A.C. of the selected frequency in the potential output windings at an initial voltage, the electrical control means also supplying, in response to the initial voltage of the A.C. in the potential output windings differing from the selected voltage, electrical A.C. to the modifying windings of a magnitude such that a magnetic flux is generated therein that will modify the initial remanent flux density in the previously formed pattern of magnetic poles so that the potential output windings reacting with this modified flux density presented by the pattern of magnetic poles in the rotating field cores will generate an A.C. of a substantially constant desired voltage and a substantially constant frequency.

6. The three phase generator of claim 5 capable of generating alternating current of substantially constant selected frequency and substantially constant selected voltage, wherein the potential output windings in each stator also comprise (c) sets of lagging windings which produce single phase A.C. which lags by about 110° to 115° the single phase A.C. generated by the primary windings in the same stator core, the single phase A.C. potential of the primary windings of any one stator being in phase with the single phase A.C. potential of the leading windings of another stator and the lagging windings of a third stator, means connecting the primary winding leads of each stator in a series with the leading and lagging windings of the other stator with which the A.C. outputs are synchronized to provide a net potential output having low total harmonic distortion.

7. In a non-interruptible power supply system to furnish A.C. of a substantially constant selected frequency and of a substantially constant voltage, in combination, a motor connected to a first source of electrical current which source is subject to (a) occasional total power interruptions for prolonged periods, (b) brief power interruptions lasting up to several seconds during which the motor will keep rotating due to its inertia, and (c) voltage irregularities including excess and subnormal voltages during which the motor will continue rotating, an independent auxiliary prime mover enabling rotation of the motor in the event of the (a) prolonged total power interruptions, a first control means responsive to a total power interruption from the first source lasting more than a predetermined period of seconds to cause the auxiliary prime mover to begin functioning, to disconnect the motor from the first source after a selected time period elapses and to connect the motor to the auxiliary prime mover to cause the motor to rotate, said first control means also being responsive to resumption of power flow from the first source of electrical current to disconnect the auxiliary prime mover from the motor, to cause the auxiliary prime mover to cease operating and to connect the motor again to the first source, a constant frequency-constant voltage A.C. generator being connected to and driven by the motor, the generator comprising a plurality of rotatable fields and a cooperating stationary wound armature associated with each field, each rotating field comprising a core high permeability soft magnetic material with a cylindrical face having an applied layer of permanent magnetic material thereon, each stationary wound armature comprising a slotted core of high permeability soft magnetic material with a cylindrical surface juxtaposed and operatively aligned with the cylindrical face of an adjacent field, each slotted armature core having an excitation coil in a first pair of adjacent slots and capable of being energized with A.C. to develop a magnetic flux of sufficient strength to produce in the juxtaposed layer of permanent magnet material a pattern of magnetization comprising north and south magnetic poles as it rotates past the excitation coil, potential output generating windings in other slots in each armature to provide for a two pole armature, modifying windings in at least two slots in each armature core at a point substantially diametrically opposite to the said first pair of slots, supplementing windings wound between at least two slots located at about 60° and 240° clockwise of the first two slots, at least one other exciter field core of high permeability soft magnetic material with a cylindrical face having a layer of permanently magnetized permanent magnetic material applied thereto and rotatably driven by the motor, and an associated slotted exciter stator with exciter windings in slots in a cylindrical surface juxtaposed and conforming to the cylindrical face of the exciter field core whereby to generate an exciter A.C. as the exciter field core rotates with respect to the exciter stator, and second electrical control means for receiving the exciter A.C. and supplying therefrom a predetermined A.C. of selected frequency and of a suitable magnitude to the excitation coil in each armature along with electrical current developed in the supplementing winding thereof to enable it to magnetize the layer of permanent magnet material in the juxtaposed field core to assume a desired pattern of magnetization at an initial high remanent flux density, the second electrical control means also comparing the voltage in the potential output windings generated when the thus magnetized field cores rotate with respect to the stators, with a standard voltage and, when they are not substantially the same, supplying sufficient electrical current to the modifying winding to develop a sufficient level of modifying magnetic flux to change the initial remanent flux in the layer of permanent magnetic material to a different remanent flux level such that it will induce the desired standard voltage in the potential output windings.

8. The power supply system of claim 7, wherein the potential output generating windings in each armature comprise (a) sets of primary windings which produce single phase A.C. in each armature, (b) sets of leading windings which produce single phase A.C. which leads the A.C. of the primary winding in the same armature core by about 110° to 115° but is in phase with the A.C. generated by the primary windings in another armature, and (c) sets of lagging windings which produce single phase A.C. which lags the single phase A.C. of the primary windings of the armature by about 110° to 115°, the primary windings being wound with one set in slots on one side of the diametral line through the excitation coil slots, and the other set being wound on the other side of the diametral line, the primary windings of each armature being connected in series with the leading windings of another armature and the lagging windings of a third armature with which the single phase A.C. is in synchronism to provide a combined voltage of a low total harmonic distortion.

9. In a three phase A.C. generator capable of generating A.C. of a substantially constant selected frequency and substantially constant selected voltage, in combination, a driving motor subject to variations in speeds in operation, a shaft rotated by the motor, a cylindrical shell attached to the shaft, three main field cores of soft magnetic material of high magnetic permeability attached to the inside walls of the shell, each main field core having a cylindrical aperture coaxial with the axis of the shaft with a layer of permanent magnetic material of high magnetic memory applied to the cylindrical surface of each aperture, the exposed surface of the layer of magnetic material being coaxial and cylindrical, a fourth exciter field core of soft magnetic material of high permeability also attached to the inside walls of the cylindrical shell and having a cylindrical aperture therein with a layer of hard magnetic material permanently magnetized into a series of poles, lining the surface of the aperture and having an expose cylindrical surface coaxial with the shaft, a frame supporting the motor, the shaft and shell for rotation thereon, a fixed support member on the frame having a portion extending into the cylindrical shell and projecting into the cylindrical apertures of the field cores, three slotted main stators with cylindrical outer surfaces carried by the fixed support member and positioned with a cylindrical outer surface of each stator operatively juxtaposed with respect to the cylindrical aperture and the layer of magnetic material of each main field core, the slotted stators comprising soft magnetic material of high permeability, each stator having a first pair of adjacent slots with an excitation coil therein, a second pair of slots at a point diametrically opposite the first pair of slots with a modifying winding therein, complementing windings wound in slots at 60° and 240° clockwise from the first pair of slots, and potential output windings in the remaining slots in each stator core to provide for a two pole armature, a fourth slotted excitor stator carried by the fixed support member and having a cylindrical surface in juxtaposition with the cylindrical surface of the exciter field core having the layer hard magnetic material permanently magnetized into a selected pattern of north and south magnetic poles, an exciting winding in the slots of the exciter stator which will generate an exciting A.C. when the exciter field core is rotated with respect thereto, electrical control means for directing the flow of a desired frequency A.C. derived from the exciter A.C. to the excitation coils in each of the three main stators, and the A.C. electrical output of the supplementing windings also being applied to the excitation coil by means of a resonant circuit therewith, the total A.C. supplied to the excitation coils being of such a magnitude that each of the excitation coils will cause the layer of permanent magnet material in the immediately juxtaposed main field core to assume a desired pattern of magnetization at a high initial remanent flux density, the potential output windings when reacting with the magnetic field of the so magnetized layer in each stator generating single phase A.C. of the same frequency as the A.C. supplied to the excitation coil, the voltage of the potential output windings being compared by the electrical control means with a desired standard voltage and any difference causing the electrical control means to supply a controlled A.C. to the modifying windings to set up a magnetic flux sufficient to modify the initial remanent flux density of the pattern of magnetization of the layer of permanent magnet material in the juxtaposed field core to a level that will induce in the potential output windings of each stator an A.C. of the desired voltage.

10. The three phase generator of claim 9, wherein the exciter windings comprise three phase windings, producing high frequency exciting A.C. during operation of the generator and each phase of such exciter windings comprise at least four coils with leads extending from each coil to the electrical control means, one lead from each coil of a phase being connected to the input terminal of one of a group of a plurality of gated semiconductor rectifiers, there being three groups of the rectifiers, a source of timed low frequency pulses of gating signals to the gates of the gated semiconductor rectifiers, the plurality of rectifiers in each group being so connected with each other that the output thereof is a low frequency A.C. comprising full wave rectified high frequency A.C. inputs, wherein each cycle of the low frequency A.C. comprises successive waves of the rectified high frequency cycles at one polarity followed by the opposite polarity, the low frequency A.C. corresponding to the selected frequency of the three phase generator, the low frequency A.C. from one group of said rectifiers being delivered to the excitation coil of one main stator, whereby to energize it and cause the layer of magnetizable permanent magnet material in the juxtaposed field core to assume a pattern of magnetization with an initial remanent magnetic flux density, the potential output windings in the main stator core generating an A.C. voltage when it moves with respect to the magnetized field core, two controllable variable shunt reactances each being connected across two of the leads from the exciter coils in each phase, voltage regulator means responsive to departures of the voltage in the potential output windings of the main stator from the selected voltage to supply an appropriate A.C. potential to each shunt reactance, so as to cause the high frequency A.C. potential generated by the exciter coils to be changed sufficiently, whereby the low frequency A.C. output of the rectifiers is similarly changed and the excitation coil is energized with a changed A.C., and thereby the initial remanent magnetic flux density in the layer of magnetic material is changed so that the voltage induced in the potential output windings of that main stator is at the selected voltage level, the voltage regulator also supplying appropriate correcting A.C. potential to the modifying winding in the same main stator to cause a prompt correcting change in the initial remanent flux density of the layer of permanent magnetic material.

11. In a generator for producing a predetermined voltage from a wound stator having primary potential generating windings therein and being operatively associated with a field core of soft magnetic material of high permeability having a layer of permanent magnetic material magnetizable to a pattern of magnetic poles with a remanent flux density, an excitation coil in slots in the wound stator, the excitation coil being energizable to magnetize the layer of permanent magnet material on the associated field core to a desired magnetic pole pattern with an initial remanent magnetic flux density as the field core and the stator rotate with respect to each other, which will generate an initial voltage in the potential generating windings in the stator, and a modifying winding in slots spaced from the excitation coil slots, the modifying winding capable of being energized with electrical current to produce a magnetic field of a magnitude to change the initial remanent flux in the magnetic pole pattern of the layer of permanent magnet material on the field core to a value such that as the primary windings interact with the so changed remanent magnetic flux field of the layer they will generate the predetermined voltage.

12. The generator of claim 11, wherein the modifying windings are placed in the stator substantially diametrically opposite to the excitation coil.

13. The generator of claim 9, wherein electrical control means are operatively associated to apply alternating electrical current in a timed relation to the excitation coil to produce the desired magnetic pole pattern in the layer of magnetic material, and responsive to the difference from the predetermined voltage of potential output of the primary windings as they interact with the initial magnetic flux of the layer from a desired value, to transmit to the modifying winding alternating electrical current in timed relation and of a magnitude sufficient to develop a magnetic field operative, to change the remanent flux density in the layer to a value such that the primary windings reacting therewith will generate the predetermined potential.

14. The generator of claim 11, wherein supplementing windings are wound in slots at about 60° and 240° clockwise from the slots containing the excitation coil, and the leads from the supplementing windings are connected to the excitation coil in a resonant circuit embodying a capacitance.

15. In a control system for controlling the output of an A.C. generator having at least one field core of soft magnetic material with a cylindrical surface carrying a layer of permanent magnetic material thereon, a cooperatively juxtaposed wound slotted armature rotatable with respect to the field core, the armature being of soft magnetic material having at least two slots with an excitation coil therein, other slots with a modifying winding therein, and other slots with primary windings for generating an A.C. potential when the armature and field core rotate with respect to each other, the control system comprising transformer means having a primary winding supplied with relatively high frequency A.C. and secondary windings supplying high frequency A.C. to a plurality of controllably energizable semiconductor devices connected in a circuit with means supplying precisely timed control pulses thereto, the controllable semiconductor devices effecting full wave rectification of the high frequency A.C. to produce successive precisely timed half cycle positive and negative pulses of lower frequency A.C., each pulse thereof comprising a plurality of fully rectified half waves of the high frequency A.C., the lower frequency A.C. so produced being conducted to a resonant circuit comprising the excitation coil, an inductance and a capacitor, the lower frequency A.C. flowing through the excitation coil producing timed pulses of successive north and south pole magnetic flux that magnetize the layer of permanent magnetic material as it rotates past the excitation coil to a pattern of north and south magnetic poles with an initial remanent flux density, the rotation of the so-patterned magnetic layer with respect to the primary windings in the armature generating an A.C. potential of a frequency substantially identical with the frequency of the A.C. applied to the excitation coil, means for comparing the A.C. generated in the primary windings with a selected potential, and means responsive to any difference in potential operative to convey a porportional amount of timed lower frequency A.C., from the output of the semiconductor devices to the modifying windings, to develop therein pulses of magnetic flux sufficient to change the initial remanent flux density in the magnetic pattern present in the layer of permanent magnetic material, to a new remanent flux density, such that the primary windings will generate substantially the selected potential.

16. In an A.C. electrical generator capable of generating A.C. of a substantially constant selected frequency and a substantially constant selected voltage, having a first support means carrying at least one power field core and an exciter field core, the power field core and the exciter field core each comprising a body of high permeability soft magnetic material and having a circular surface with an applied layer of magnetizable permanent magnetic material thereon, the applied layer of permanent magnetic material on the exciter field core being magnetized to a pattern of north and south magnetic poles, a second support means carrying slotted and wound armature cores equal to the number of the field cores and each being juxtaposed and operatively aligned with a field core, each armature comprising a body of high permeability soft magnetic material with a circular surface close to and concentric with the circular surface of its juxtaposed field core, means for rotating one of the support means with respect to the other whereby the wound armature juxtaposed with respect to the exciter field core will generate an A.C. potential as the magnetized layer with north and south magnetic poles moves with respect to it, the improvement comprising providing a plurality of windings in each juxtaposed with a power field core wherein the plurality of windings comprises:
 (a) an excitation coil energizable with A.C. in a first pair of slots, the excitation coil producing a pattern of north and south magnetic poles in the layer of permanent magnetic material in the juxtaposed power field core as it rotates,
 (b) a supplementing winding in selected other slots for generating an A.C. as the so-magnetized layer moves with respect to the armature, A.C. so generated is supplied to the excitation coil, and
 (c) power output windings in other slots for generating A.C. potential as the magnetized field core rotates with respect to the armature,
and electrical control means to supply the excitation coil with A.C. derived from the A.C. from the exciter armature combined with the A.C. from the supplementing winding to enable the excitation coil to produce a sufficiently strong magnetic field to cause the layer of permanent magnetic material juxtaposed with it to form a desired pattern of north and south magnetic poles at a desired level of magnetic remanence whereby to enable the power output windings to generate A.C. potentials of the selected constant frequency and the selected constant voltage.

17. The A.C. electrical generator of claim 16 wherein the plurality of windings in each armature juxtaposed with a power field core also includes a modifying winding, disposed in other slots, the electrical control means responsive to signals based on the A.C. voltage in the power output windings to supply, when required, a timed A.C. to the modifying windings to develope a magnetic field sufficient to change the magnetic remanence in its juxtaposed power field core's layer of permanent magnetic material previously magnetized by the excitation coil, whereby the power output windings will generate the selected voltage.

* * * * *